(12) United States Patent
Rahimizad et al.

(10) Patent No.: US 11,790,377 B2
(45) Date of Patent: Oct. 17, 2023

(54) DIGITAL FINGERPRINTING

(71) Applicant: NIKE, Inc., Beaverton, OR (US)

(72) Inventors: Nader Rahimizad, Portland, OR (US); Christopher Andon, Portland, OR (US); Hien Tommy Pham, Beaverton, OR (US)

(73) Assignee: NIKE, Inc., Beaverton, OR (US)

( * ) Notice: Subject to any disclaimer, the term of this patent is extended or adjusted under 35 U.S.C. 154(b) by 136 days.

(21) Appl. No.: 17/116,527

(22) Filed: Dec. 9, 2020

(65) Prior Publication Data

US 2021/0174377 A1 Jun. 10, 2021

Related U.S. Application Data

(60) Provisional application No. 63/031,118, filed on May 28, 2020, provisional application No. 62/945,639, filed on Dec. 9, 2019.

(51) Int. Cl.
*G06Q 30/00* (2023.01)
*G06Q 30/018* (2023.01)
(Continued)

(52) U.S. Cl.
CPC ........... *G06Q 30/0185* (2013.01); *A43B 3/34* (2022.01); *G06K 7/10861* (2013.01);
(Continued)

(58) Field of Classification Search
CPC ............. G06K 7/10861; G06K 7/1443; G06K 7/1417; G06K 19/027; G06Q 10/087; G06Q 20/3672; G06Q 20/3839
(Continued)

(56) References Cited

U.S. PATENT DOCUMENTS

| 2,907,058 A | 10/1959 | Evins |
| D561,438 S | 2/2008 | Belley |

(Continued)

FOREIGN PATENT DOCUMENTS

| AU | 9670998 A | 4/1999 |
| CN | 106174905 B | 6/2020 |

(Continued)

*Primary Examiner* — Daniel St. Cyr
(74) *Attorney, Agent, or Firm* — Quinn IP Law

(57) ABSTRACT

A method includes providing a machine-readable identifier attached to an article of clothing, each of the plurality of identifying ciphers is disposed in a predetermined discrete area; receiving a scanned image of the machine-readable identifier to detect the identifying ciphers of each of the predetermined discrete areas; retrieving a predetermined stored cipher for each of the predetermined discrete areas; comparing the identifying ciphers of each of the predetermined discrete areas with the predetermined stored ciphers for each of the predetermined discrete areas to determine if each identifying cipher in each predetermined discrete area matches a corresponding stored cipher for each of the respective predetermined discrete areas; and determining that the article of clothing is authentic in response to determining that each identifying cipher in each of the predetermined discrete areas matches the corresponding stored cipher for each of the respective predetermined discrete areas.

15 Claims, 10 Drawing Sheets

(51) Int. Cl.
*G06K 7/14* (2006.01)
*G06Q 20/36* (2012.01)
*G06Q 20/38* (2012.01)
*G06K 7/10* (2006.01)
*G06K 19/02* (2006.01)
*G06K 19/06* (2006.01)
*G06Q 10/087* (2023.01)
*H04L 9/08* (2006.01)
*A43B 3/34* (2022.01)
*G06K 19/14* (2006.01)

(52) U.S. Cl.
CPC ......... *G06K 7/1417* (2013.01); *G06K 7/1443* (2013.01); *G06K 7/1447* (2013.01); *G06K 19/027* (2013.01); *G06K 19/06037* (2013.01); *G06Q 10/087* (2013.01); *G06Q 20/3672* (2013.01); *G06Q 20/3674* (2013.01); *G06Q 20/3829* (2013.01); *H04L 9/088* (2013.01); *G06K 7/1413* (2013.01); *G06K 19/06028* (2013.01); *G06K 19/145* (2013.01); *G06K 2007/10504* (2013.01); *G06Q 2220/00* (2013.01)

(58) Field of Classification Search
USPC .................................. 235/385, 380; 705/318
See application file for complete search history.

(56) References Cited

U.S. PATENT DOCUMENTS

| | | | |
|---|---|---|---|
| 7,995,196 B1* | 8/2011 | Fraser | G06V 10/147 356/71 |
| 8,028,892 B2* | 10/2011 | Regensburger | G06Q 20/382 705/14.1 |
| 8,171,567 B1* | 5/2012 | Fraser | H04L 9/3236 726/32 |
| 10,013,633 B1 | 7/2018 | Manmatha et al. | |
| 2005/0076536 A1 | 4/2005 | Hatfield et al. | |
| 2005/0156318 A1 | 7/2005 | Douglas | |
| 2007/0200335 A1* | 8/2007 | Tuschel | G06K 19/10 283/72 |
| 2009/0044432 A1 | 2/2009 | O'Connor et al. | |
| 2010/0269271 A1 | 10/2010 | Kim et al. | |
| 2012/0104097 A1 | 5/2012 | Moran et al. | |
| 2012/0310848 A1* | 12/2012 | Gao | G06Q 30/018 705/317 |
| 2014/0244495 A1 | 8/2014 | Davis et al. | |
| 2015/0089841 A1 | 4/2015 | Smaldone et al. | |
| 2015/0128452 A1 | 5/2015 | Hull et al. | |
| 2016/0307381 A1 | 10/2016 | Siebels et al. | |
| 2017/0099907 A1 | 4/2017 | Cin | |
| 2017/0251761 A1 | 9/2017 | Cin et al. | |
| 2017/0280822 A1 | 10/2017 | Langvin et al. | |
| 2018/0117446 A1 | 5/2018 | Tran et al. | |
| 2019/0147417 A1 | 5/2019 | Arora et al. | |
| 2019/0266563 A1 | 8/2019 | Jacobson et al. | |
| 2019/0361917 A1* | 11/2019 | Tran | G06Q 20/308 |
| 2020/0293701 A1 | 9/2020 | Modi et al. | |

FOREIGN PATENT DOCUMENTS

| | | |
|---|---|---|
| JP | 2005238826 A | 9/2005 |
| JP | 2016110544 A | 6/2016 |
| WO | 2016077934 A1 | 5/2016 |
| WO | 2016144413 A1 | 9/2016 |
| WO | 2019211178 A1 | 11/2019 |

* cited by examiner

DIGITAL FINGERPRINTING

CROSS-REFERENCE TO RELATED APPLICATIONS

The present application claims priority to, and the benefit of, U.S. Provisional Patent Application 62/945,639 filed on Dec. 9, 2019, and U.S. Provisional Patent Application 63/031,118 filed on May 28, 2020.

TECHNICAL FIELD

The present disclosure relates generally to a computerized system and method for authenticating physical retail products. More specifically, the present disclosure relates to systems and methods for digitally fingerprinting physical retail products to authenticate such products.

BACKGROUND

Manufacturers of high-quality footwear have long been plagued by the sale of counterfeit footwear, namely imitation goods that are made with the intent to deceive buyers into believing that they are purchasing the true manufacturer's authentic goods. Similar issues exist within the digital realm, where digital products are often subject to unauthorized sale and reproduction. This unauthorized/counterfeit production and/or digital reproduction can erode a brand's value and/or exclusivity, can negatively affect a company's profitability, and may compromise a user's subjective perception of the product as "collectable."

Market participants and brand enthusiasts in a free market typically assign a higher value to an object if there is limited supply and/or if there is excess demand for that object. It is therefore desirable to develop anti-counterfeiting techniques to help identify counterfeit goods and to prevent illicit sales. Specifically, it would be beneficial to develop anti-counterfeiting techniques that directly influence and/or control the nature and ultimate supply of physical retail objects within this market.

SUMMARY

The present disclosure describes anti-counterfeiting techniques to track each individual apparel and shoes, such as collectible shoes, with minimal hardware. These anti-counterfeiting techniques are used to manufacture and authenticate unique articles of clothing, such as apparel and shoes, thereby prevent the sales of counterfeit goods.

In some aspects of the present disclosure, a method of authenticating an article of clothing may include providing a machine-readable identifier. The machine-readable identifier may be attached to the article of clothing. The machine-readable identifier may be representative of an authenticity of the article of clothing attached thereto. The machine-readable identifier may include a plurality of identifying ciphers. Each of the plurality of identifying ciphers may be disposed in a respective predetermined discrete area of a plurality of predetermined discrete areas of the machine-readable identifier. The method may further include receiving a scanned image of the machine-readable identifier to detect the identifying ciphers of each of the predetermined discrete areas. The method may further include retrieving a predetermined stored cipher for each of the predetermined discrete areas each corresponding to one of the plurality of predetermined discrete areas. The method may further include comparing the identifying ciphers of each of the predetermined discrete areas with the predetermined stored ciphers for each of the predetermined discrete areas to determine if each identifying cipher in each of the predetermined discrete areas matches a corresponding stored cipher for each of the respective predetermined discrete areas. The method may further include determining that the article of clothing is authentic in response to determining that each identifying cipher in each of the predetermined discrete areas matches the corresponding stored cipher for each of the respective predetermined discrete areas.

The machine-readable identifier may be a digitally printed image on the article of clothing, and the digitally printed image may include the plurality of predetermined discrete areas.

The machine-readable identifier may include a unique logo directly disposed on the article of clothing. The machine-readable identifier may be a barcode. The identifying ciphers of each of the predetermined discrete areas may include a plurality of encoding symbols. At least one of the plurality of encoding symbols may include a graphical shape, and the graphical shape may include at least one chosen from a circle, a square, a triangle. The identifying ciphers of each of the predetermined discrete areas may have a greyscale color, and the greyscale color represents a binary number. The method may further include receiving a scanned image of the machine-readable identifier that includes continuously receiving image data from the machine-readable identifier using a camera of the interface device. The article of clothing may be an article of apparel and/or an article of footwear. The article of footwear may include an upper and a sole structure attached to the upper. The predetermined discrete areas may be a plurality of magnetic zones of the sole structure. The magnetic zones may include a plurality of naturally magnetic particles and/or a plurality of magnetized particles. Each of the predetermined discrete areas may have a respective magnetic flux density value. The identifying ciphers of each of the predetermined discrete areas may be the respective flux density value, and the sensor may include a magnetometer.

The identifying cipher of each of the predetermined discrete areas may be a magnetic flux density value of each of the predetermined discrete areas. The predetermined stored cipher for each of the predetermined discrete areas is a stored value. The stored value for each of the predetermined discrete areas may be compared with the magnetic flux density value of each of the predetermined discrete areas to determine if each magnetic flux density value in each of the predetermined discrete areas matches a corresponding stored value for each of the respective predetermined discrete areas. The article of clothing may include a location feature to locate each of the predetermined discrete areas in the article of clothing.

The location feature may be a near field communication (NFC)-enabled device and/or a digitally printed image. The article of clothing may be an article of footwear. The article of footwear may include an upper and a sole structure attached to the upper. The plurality of predetermined discrete areas may be located in the upper and/or the sole structure.

The machine-readable identifier may be a private key for a wallet. The private key may be configured as a token that is uniquely registered on a blockchain. The article of clothing functions as the wallet and embodies the private key. The blockchain may be a private chain. The sensor may be configured to read the machine-readable identifier to retrieve the machine-readable identifier from the article of clothing to unlock a digital collectible. The digital collectible may be associated with the blockchain.

The present disclosure also describes an article of clothing. The article of clothing includes a machine-readable identifier. The machine-readable identifier may include a plurality of predetermined discrete areas. The machine-readable identifier may include a plurality of identifying ciphers. Each of the identifying ciphers may be disposed in a respective predetermined discrete area of a plurality of predetermined discrete areas of the machine-readable identifier. Each of the identifying ciphers in each of the predetermined discrete areas may match a remotely-stored cipher for each of the respective predetermined discrete areas to facilitate authentication of the article of clothing.

The article of clothing may be an article of footwear. The article of footwear may include an upper and a sole structure attached to the upper. The machine-readable identifier may be a logo digitally printed on the upper. The logo may be a digitally-printed image on the upper. The logo may include conductive ink. The plurality of identifying ciphers may include a plurality of colors. Each color may have color values. The color values may be grouped in a plurality of predetermined value ranges. An encoding bit may be associated with a respective predetermined value range of the predetermined value ranges. At least one of the plurality of identifying ciphers may be an encoding symbol.

The article of clothing may be an article of apparel. The article of apparel may be a shirt. The shirt may include a main shirt body, a first sleeve attached to the main shirt body, and a second sleeve attached to the main shirt body. The machine-readable identifier may be disposed on the main shirt body. The machine-readable identifier may be a logo. The logo may include conductive ink. At least one of the plurality of identifying ciphers may be a geometric shape. The geometric shape may be a triangle, a square, and/or a circle.

The article of clothing may be an article of footwear. The article of footwear may include an upper and a sole structure attached to the upper. Each of the predetermined discrete areas may be a magnetic zone on the sole structure. Each magnetic zone may have corresponding magnetic density flux values that match a remotely-stored magnetic density flux values for each of a respective magnetic zone to facilitate authentication of the article of footwear. The sole structure may include an insole that is entirely magnetized to prevent bacteria growth in the sole structure. Each of the magnetic zones may include a plurality of randomly-dispersed magnetic particles. The magnetic zones may have magnetic density flux values that are different from one another.

The article of clothing may further include a location feature to locate each of the predetermined discrete areas in the article of clothing. The location feature may be a near field communication (NFC)-enabled device and/or a digitally printed image.

The present disclosure also describes a method of manufacturing an article of clothing. This method may include placing a machine-readable identifier on the article of clothing. The machine-readable identifier is representative of an authenticity of the article of clothing. The machine-readable identifier may include a plurality of identifying ciphers. Each of the identifying ciphers may be disposed in a respective predetermined discrete area of a plurality of predetermined discrete areas of the machine-readable identifier. The method may further include determining contents and characteristics of the plurality of identifying ciphers in the machine-readable identifier.

The method may further include determining a size of a grid based on the contents of the contents and characteristics of the plurality of identifying ciphers in the machine-readable identifier, and each square of the grid may be one of the predetermined discrete areas. In the present disclosure, the terms "predetermined discrete areas" and "grid" are used interchangeably.

The method may further include inputting encoding parameters into a remote host system. The encoding parameters may include manufacturing date, manufacturing id, serial number, product style, colors, and/or global trade item number (GTIN) of the article of clothing.

The method may further include assigning a bit value to each of the plurality of identifying ciphers. The method may further include assigning electrical resistance values to each bit value. Assigning the electrical resistance values may include assigning the electrical resistance values for each of the plurality of predetermined discrete areas.

The method may further include generating ink jet printing instructions based on the assigned electrical resistance values to print the machine-readable identifier on the article of clothing.

Placing the machine-readable identifier on the article of clothing may include printing the machine-readable identifier based on the assigned electrical resistance values. The machine-readable identifier may be printed with conductive ink having the assigned electrical resistance values for each of the plurality of discrete areas of the machine-readable identifier. Placing the machine-readable identifier on the article of clothing may include adding a magnetic material to a polymeric material used to mold the sole structure to form magnetic zones in the sole structure. The magnetic zones may be the predetermined discrete areas of the machine-readable identifier. Adding the magnetic material may include adding randomly dispersing natural magnetic particles in the polymeric material used to mold the sole structure. Adding the magnetic material may include adding magnetizable material in the polymeric material used to mold the sole structure.

The method may further include magnetizing each of the magnetic zones. The method may further include measuring a magnetic property value of each of the magnetic zones and storing the magnetic property values of each of the magnetic zones in a remote host system.

The above summary is not intended to represent every embodiment or every aspect of the present disclosure. Rather, the foregoing summary merely provides an exemplification of some of the concepts and features set forth herein. The above features and advantages, and other features and attendant advantages of this disclosure, will be readily apparent from the following detailed description of illustrated examples and representative modes for carrying out the present disclosure when taken in connection with the accompanying drawings and the appended claims. Moreover, this disclosure expressly includes any and all combinations and subcombinations of the elements and features presented above and below.

Figure 1:
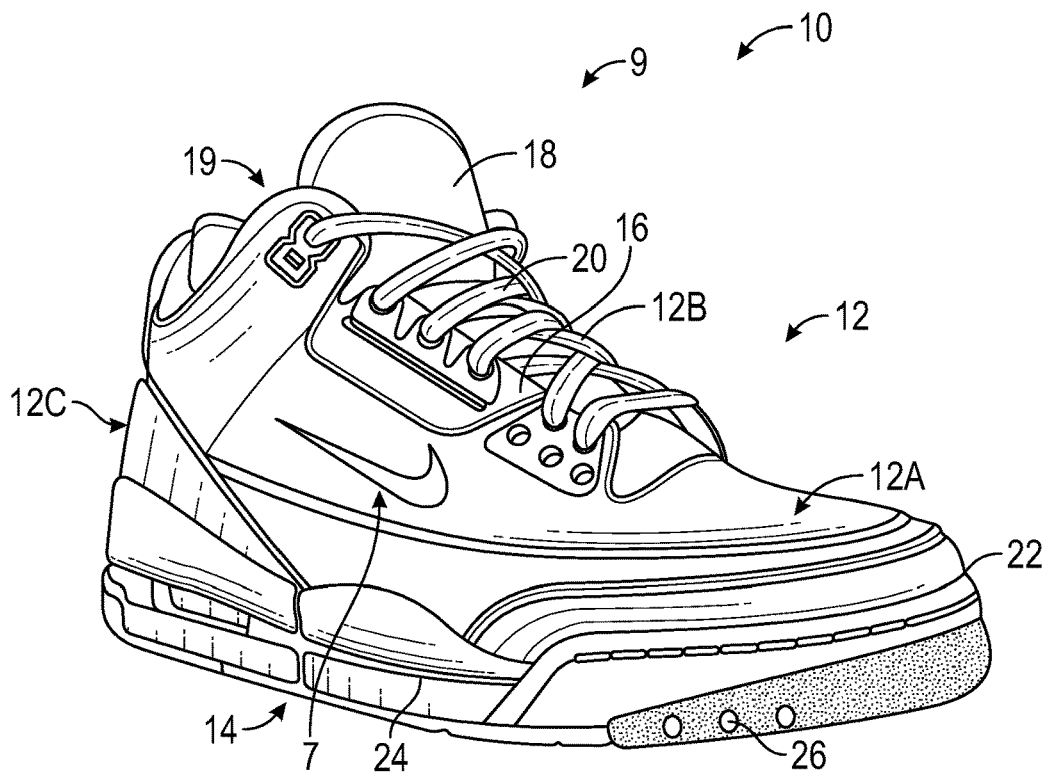
FIG. 1 is a lateral side-view illustration of a representative article of footwear with a machine-readable identifier in accordance with aspects of the present disclosure.

The present disclosure is amenable to various modifications and alternative forms, and some representative embodiments are shown by way of example in the drawings and will be described in detail herein. It should be understood, however, that the novel aspects of this disclosure are not limited to the particular forms illustrated in the above-enumerated drawings. Rather, the disclosure is to cover all modifications, equivalents, combinations, subcombinations, permutations, groupings, and alternatives falling within the scope of this disclosure as encompassed by the appended claims.

DETAILED DESCRIPTION

The present disclosure describes unique methods of storing one or more digital identifiers directly within an article of footwear or apparel. These identifiers may be used to prove the authenticity of the article or for other purposes as so desired. In some embodiments, multi-factor authentication techniques may be employed with a plurality of embedded identifiers, for example where one encoded identifier may provide the instruction on how or where a second encoded identifier may be extracted.

In the case of an article of footwear, magnetic or selectively magnetizable particles may be embedded within a foam midsole or outsole during the initial fabrication of the sole. Due to the nature of the molding process, there is a high likelihood that these particles may achieve a random distribution/dispersion throughout the foam. In one configuration, the magnetic profile, or discrete portions thereof, may serve as one manner of embedding a registerable identifier. Likewise, other identifiers may be digitally printed or encoded in a design provided, for example, on a logo or graphic. In a footwear example, an identifier encoded in a logo or graphic provided on an upper of an article of footwear may point to specific regions of a magnetic or magnetizable sole of the article of footwear from which a second identifier code may be extracted.

When used in an authentication context, the identifier may comprise an encrypted code that, if run through an appropriate decryption algorithm, may validate the authenticity of the article. Alternatively, the identifier may be a unique identifier that is recorded to a private or public database at the time of manufacture. Subsequent authenticity checks may simply involve reading the identifier and consulting the database. To complicate the ability to spoof the authentication routine, it may be beneficial to embed the identifier in an integral component of the article—i.e., one that is not easily removed or replaced without considerable or irreversible damage to the article.

While authentication is one use of the present technology, a second use may include storing a unique code for other purposes (e.g., "cold storage"). For example, in one configuration, the embedded identifier may serve as an unlock code, electronic ticket/pass, or private cryptographic key for unlocking a digital collectable, digital attribute, digital experience, or for providing special functionality in an electronic application, early access to subsequently released merchandise, or the like. For example, in one configuration, the embedded identifier may be a cryptographic private key or unique code linked to a cryptographic private key that may enable a user to acquire a cryptographically secured digital collectable (e.g., one registered to an immutable ledger such as represented via blockchain technology). Examples of such cryptographically secured digital collectables (e.g., "CryptoKicks") are described in U.S. patent application Ser. No. 16/423,671, which issued as U.S. Pat. No. 10,505,726 on Dec. 10, 2019, and U.S. patent application Ser. No. 16/707,720, filed on Dec. 9, 2019, which published as U.S. Patent Application Publication No. 2020/0184547 on Jun. 11, 2020, both of which are incorporated by reference in their entirety. In another embodiment, the embedded identifier may enable a user to acquire an attribute pack for modifying an attribute of a cryptographically secured digital collectable or for providing unique ability improvements or an alteration to the appearance of a user-controllable character in a video game application. It is also envisioned that the embedded identifier may provide access to a token, database entry, or other blockchain ledger entry that has one or more product attributes recorded to it. For example, the product attributes are attributes of the article of footwear or article of apparel and may include data relating to where the product was made, how the product was made, features of the product, and/or sustainability information about the product. As a non-limiting example, the sustainability information may include an indication that the product was made with a certified organic material or through environmentally friendly manufacturing methods (e.g., certified organic designations). Other uses may be further appreciated from the following disclosure.

This disclosure is susceptible of embodiment in many different forms. Representative examples of the disclosure are shown in the drawings and will be described in detail herein with the understanding that these representative examples are provided as an exemplification of the disclosed principles, not limitations of the broad aspects of the disclosure. To that extent, elements and limitations that are described in the Abstract, Technical Field, Background, Summary, and Detailed Description sections, but not explicitly set forth in the claims, should not be incorporated into the claims, singly or collectively, by implication, inference or otherwise.

For purposes of the present detailed description, unless specifically disclaimed: the singular includes the plural and vice versa; the words "and" and "or" shall be both conjunctive and disjunctive; the words "any" and "all" shall both mean "any and all"; and the words "including," "comprising," "having," "containing," and the like shall each mean "including without limitation." Moreover, words of approximation, such as "about," "almost," "substantially," "approximately," and the like, may be used herein in the sense of "at, near, or nearly at," or "within 0-5% of," or "within acceptable manufacturing tolerances," or any logical combination thereof, for example. Lastly, directional adjectives and adverbs, such as fore, aft, medial, lateral, proximal, distal, vertical, horizontal, front, back, left, right, etc., may be with respect to an article of footwear when worn on a user's foot and operatively oriented with a ground-engaging portion of the sole structure seated on a flat surface, for example.

Referring now to the drawings, wherein like reference numbers refer to like features throughout the several views, there is shown in FIG. 1 a representative article of footwear, which is designated generally at 10 and portrayed herein for purposes of discussion as an athletic shoe or "sneaker." The illustrated article of footwear 10—also referred to herein as "footwear" or "shoe" for brevity—is merely an exemplary application with which novel aspects and features of this disclosure may be practiced. In one embodiment, the illustrated article of footwear 10 may be or resemble a Crypto-Kick (i.e., a computer-generated digital representation of an article of footwear 10 that is uniquely registered to an immutable cryptographic database such as a blockchain network). In the same vein, implementation of the present concepts for a digital shoe and cryptographic token for footwear should also be appreciated as a representative implementation of the disclosed concepts. It will therefore be understood that aspects and features of this disclosure may be utilized for other types of footwear, and may be incorporated into any logically relevant consumer product. As used herein, the terms "shoe" and "footwear," including permutations thereof, may be used interchangeably and synonymously to reference any suitable type of garment worn on a human foot. Lastly, features presented in the drawings are not necessarily to scale and are provided purely for instructional purposes. Thus, the specific and relative dimensions shown in the drawings are not to be construed as limiting.

FIG. 1 schematically shows an article of clothing 9, such as an article of footwear 10. The term "article of clothing" means a covering designed to be worn on a person's body, including, but not limited to, shirts, pants, and shoes. The article of footwear 10 may be a collectible and is illustrated as a bipartite construction that is primarily composed of a foot-receiving upper 12 mounted on top of a subjacent sole structure 14. While only a single shoe 10 for a left foot of a user is shown in FIG. 1, a mirrored, substantially identical counterpart for a right foot of a user may be provided. Recognizably, the shape, size, material composition, and method of manufacture of the shoe 10 may be varied, singly or collectively, to accommodate practically any conventional or nonconventional footwear application.

With continued reference to FIG. 1, the upper 12 is depicted as having a shell-like, closed toe and heel configuration for encasing a human foot. Upper 12 of FIG. 1 is generally defined by three adjoining sections, namely a toe box 12A, a vamp 12B and a rear quarter 12C. The toe box 12A is shown as a rounded forward tip of the upper 12 that extends from distal to proximal phalanges to cover and protect the user's toes. By comparison, the vamp 12B is an arched midsection of the upper 12 that is located aft of the toe box 12A and extends from the metatarsals to the cuboid. As shown, the vamp 12B also provides a series of lace eyelets 16 and a shoe tongue 18. Positioned aft of the vamp 12B is a rear quarter 12C that extends from the transverse tarsal joint to the calcaneus bone, and includes the rear portions of the upper 12. While portrayed in the drawings as comprising three primary segments, the upper 12 may be fabricated as a single-piece construction or may be composed of any number of segments, including a toe cap, heel cap, ankle cuff, interior liner, etc. For sandal and slipper applications, the upper 12 may take on an open toe or open heel configuration, or may be replaced with a single strap or multiple interconnected straps.

The upper 12 portion of the footwear 10 may be fabricated from any one or combination of a variety of materials, such as textiles, engineered foams, polymers, natural and synthetic leathers, etc. Individual segments of the upper 12, once cut to shape and size, may be stitched, adhesively bonded, fastened, welded or otherwise joined together to form an interior void for comfortably receiving a foot. The individual material elements of the upper 12 may be selected and located with respect to the footwear 10 in order to impart desired properties of durability, air-permeability, wear-resistance, flexibility, appearance, and comfort, for example. An ankle opening 19 in the rear quarter 12C of the upper 12 provides access to the interior of the shoe 10. A shoelace 20, strap, buckle, or other conventional mechanism may be utilized to modify the girth of the upper 12 to more securely retain the foot within the interior of the shoe 10 as well as to facilitate entry and removal of the foot from the upper 12. Shoelace 20 may be threaded through a series of eyelets 16 in or attached to the upper 12; the tongue 18 may extend between the lace 20 and the interior void of the upper 12.

Sole structure 14 is rigidly secured to the upper 12 such that the sole structure 14 extends between the upper 12 and a support surface upon which a user would stand. The sole structure 14 may be fabricated as a sandwich structure with a top-most insole 22, an intermediate midsole 24, and a bottom-most outsole 26 or outsole surface. Alternative sole configurations may be fabricated with greater or fewer than three layers. Insole 22 is shown located partially within the interior void of the footwear 10, operatively attached at a lower portion of the upper 12, such that the insole 22 abuts a plantar surface of the foot. Underneath the insole 22 is a midsole 24 that incorporates one or more materials or embedded elements that enhance the comfort, performance, and/or ground-reaction-force attenuation properties of footwear 10. These elements and materials may include, individually or in any combination, a polymer foam material, such as polyurethane or ethylvinylacetate (EVA), filler materials, moderators, air-filled bladders, plates, lasting elements, or motion control members. Outsole 26 is located underneath the midsole 24, defining some or all of the bottom-most, ground-engaging portion of the footwear 10. The outsole 26 may be formed from a natural or synthetic rubber material that provides a durable and wear-resistant surface for contacting the ground. In addition, the outsole 26 may be contoured and textured to enhance the traction (i.e., friction) properties between footwear 10 and the underlying support surface. As a general matter, each element, panel, section, and material of the article of footwear 10 shown in FIG. 1 may be separately rendered or defined in a digital CryptoKick. Furthermore, these attributes may similarly be reflected within the genetic code of the non-fungible token (NFT) such as discussed in in U.S. patent application Ser. No. 16/423,671, which issued as U.S. Pat. No. 10,505,726 on 10 Dec. 2019.

With continued reference in FIG. 1, the article of clothing 9 includes a machine-readable identifier 7. As discussed above, the article of footwear 10 may be the article of footwear 10. The article of footwear 10 includes the machine-readable identifier 7. An interface device 39 (FIG. 3) is configured to read the machine-readable identifier 7 to confirm the authenticity of the article of clothing 9. To do so, the interface device 39 includes a sensor 41, such as a camera. The sensor 41 is configured to scan the machine-readable identifier 7 to determine the authenticity of the article of clothing 9. The interface device 39 may be referred to as a user device. In an aspect of the present disclosure, the machine-readable identifier 7 may be a unique logo, such as the NIKE® Swoosh, and/or a barcode. The machine-readable identifier 7 is directly attached and/or digitally printed to the upper 12. For instance, the identifier 7 may be integrally formed with the upper 12 of the article of footwear 10. As such, the upper 12 and the machine-readable identifier 7 form a one-piece structure to prevent the machine-readable identifier 7 from detaching from the article of footwear 10. While the machine-readable identifier 7 may be used to authenticate the article of clothing 9 as discussed above, it is contemplated that the machine-readable identifier 7 may additionally or alternatively be used for other purposes. For example, the machine-readable identifier 7 may be used to unlock a digital collectible, to unlock a digital attribute package for a digital collectible, and/or as a key of a blockchain. When used in an authentication context, the identifier 7 may include an encrypted code that, if run through an appropriate deception algorithm, may validate the authenticity of the article 9. Alternatively, the identifier 7 may be a unique identifier that is recorded to a private or public database 60 (FIG. 4) at the time of manufacture. Subsequent authenticity checks may simply involve reading the identifier 7 and consulting the database 60. To complicate the ability to spoof the authentication routine, it may be beneficial to embed the identifier 7 in an integral component of the article 9—i.e., one that is not easily removed or replaced without considerable or irreversible damage to the article 9.

Figure 2:
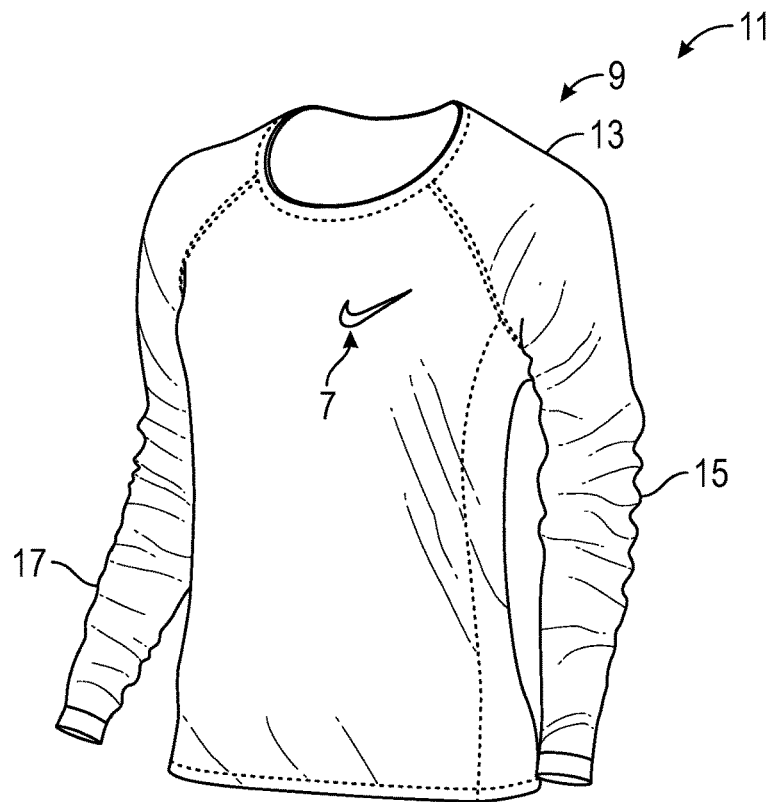
FIG. 2 is a front, isometric view of an article of apparel with a machine-readable identifier in accordance with aspects of the present disclosure.

With reference to FIG. 2, the article of clothing 9 may be an article of apparel 11 (e.g., shirt). The article of apparel 11 may be a long sleeves workout shirt. In some aspect of the present disclosure, the article of apparel 11 includes a main shirt body 13, a first sleeve 15, and a second sleeve 17. The first sleeve 15 and the second sleeve 17 are attached to the main shirt body 13. In some aspects of the present disclosure, the machine-readable identifier 7 may be a logo, such as the NIKE® Swoosh, and/or a barcode. The machine-readable identifier 7 may be directly attached to the main shirt body 13. For example, the machine-readable identifier 7 may be integrally formed with the main shirt body 13. As such, the article of apparel 11 and the machine-readable identifier 7 form a one-piece structure to prevent the machine-readable identifier 7 from detaching from the article of apparel 11. It is envisioned, however, that the machine-readable identifier 7 may be attached to the first sleeve 15 and/or the second sleeve 17.

FIG. 2 is a diagrammatic illustration of an exemplary decentralized computing system, designated generally as 30. The decentralized computing system 30 may include control logic authentication the article of clothing 9 using the machine-readable identifier 7. Further, the decentralized computing system 30 may include control logic for mining, intermingling, and exchanging products and authentic digital fingerprints. In the present disclosure, the term "product digital fingerprint" means compact digital impressions extracted from an article of clothing 9 which represent contents' characteristics and have enough details to identify a content variant upon comparison. The product digital fingerprints are extracted from the machine-readable identifier 7 of the article of clothing 9 and includes content with enough detail to identify a content variant upon comparison. It is envisioned that the decentralized computing system 30 may additionally have an attendant blockchain control logic for mining, intermingling, and exchanging blockchain-enabled digital collectibles. User 5 communicatively couples to a remote host system 34 and/or a cloud computing system 36 via a wireless communications network 38. While illustrating a single user 5 communicating over the decentralized computing system 30 with a single host system 34 and a single cloud computing system 36, it is envisioned that any number of users may communicate with any number of remote computing nodes that are suitably equipped for wirelessly exchanging information and data. Wireless data exchanges between the user 5 and remote computing nodes on the decentralized computing system 30 may be conducted directly, e.g., through direct communications between the host system 34, cloud computing system 36 and an interface device 39 (e.g., the user's smartphone, smartwatch, or other suitable personal computing device), or indirectly, e.g., with all communications between the user 5 and other computing nodes being routed through the host system 34. Only select components of the decentralized computing system 30 are shown and will be described in detail herein. Nevertheless, the systems and devices discussed herein can include numerous additional and alternative features, and other available hardware and well-known peripheral components, for example, for carrying out the various methods and functions disclosed herein.

With continuing reference to FIG. 2, the host system 34 may be implemented as a high-speed server computing device or a mainframe computer capable of handling bulk data processing, resource planning, and transaction processing. For instance, the host system 34 may operate as middleware in a client-server interface for conducting any necessary data exchanges and communications with one or more "third party" servers to complete a particular transaction. The cloud computing system 36, on the other hand, may operate as middleware for IoT (Internet of Things), WoT (Web of Things), Internet of Adaptive Apparel and Footwear (IoAAF), and/or M2M (machine-to-machine) services, connecting an assortment of heterogeneous electronic devices with a service-oriented architecture (SOA) via a data network. As an example, cloud computing system 36 may be implemented as a middleware node to provide different functions for dynamically onboarding heterogeneous devices, multiplexing data from each of these devices, and routing the data through reconfigurable processing logic for processing and transmission to one or more destination applications. Network 38 may be any available type of network, including a combination of public distributed computing networks (e.g., Internet) and secured private networks (e.g., local area network, wide area network, virtual private network). It may also include wireless and wireline transmission systems (e.g., satellite, cellular network, terrestrial networks, etc.). Most if not all data transaction functions carried out by the user 5 may be conducted, for example, over a wireless network, such as a wireless local area network (WLAN) or cellular data network.

As a decentralized platform, computing system 30 may operate as an open, yet encrypted peer-to-peer network in which asset transaction records—known as "blocks"—are linked via cryptographic hash functions in a distributed, immutable ledger of interconnected blocks, i.e., a "blockchain." Each block in the chain includes one or more digital asset transactions accompanied by corroboration information representing a validity of each transaction as assessed by peer-validation devices. Encrypted, decentralized computing architectures allow for identity verification and authentication of transacted assets while preventing duplication of a cryptography-protected ("cryptographic") digital asset registered to the platform. With blockchain, each node has a full copy of the chain. Decentralized asset management may work by encrypting a proprietary asset file, breaking the encrypted code into tiny "nonsense" shards, and sending these shards to numerous different computing nodes on the decentralized computing network. A validated owner is provided with a private key that indicates where in the network the asset is located and how to reassemble or "decrypt" the file. For use as a distributed ledger, an individual blockchain is typically managed by a host administrator and distributed to multiple peers collectively adhering to a protocol for inter-node communication and block validation.

One should appreciate that the disclosed systems and techniques provide many advantageous technical effects including construction and storage of a digital asset blockchain representing user-to-user transactions of virtual collectibles associated with real-world products. Construction and storage of a digital asset blockchain enables networked computing devices to quickly and efficiently generate, validate and transact digital asset data, thereby improving the performance of the individual computing devices. A decentralized network of interconnected computing nodes may function as a "supercomputer" that has access to many parallel processors, coordinating the assignment and reassembly of various chunks of computation. In so doing, the network is more computationally efficient, rapid, and inexpensive than a centralized computing system or a single processing farm. In the same vein, decentralized storage provides each individual computing node with tremendous storage capacity that is limited only by the number of peer devices and their cumulative available memory space.

Figure 3:
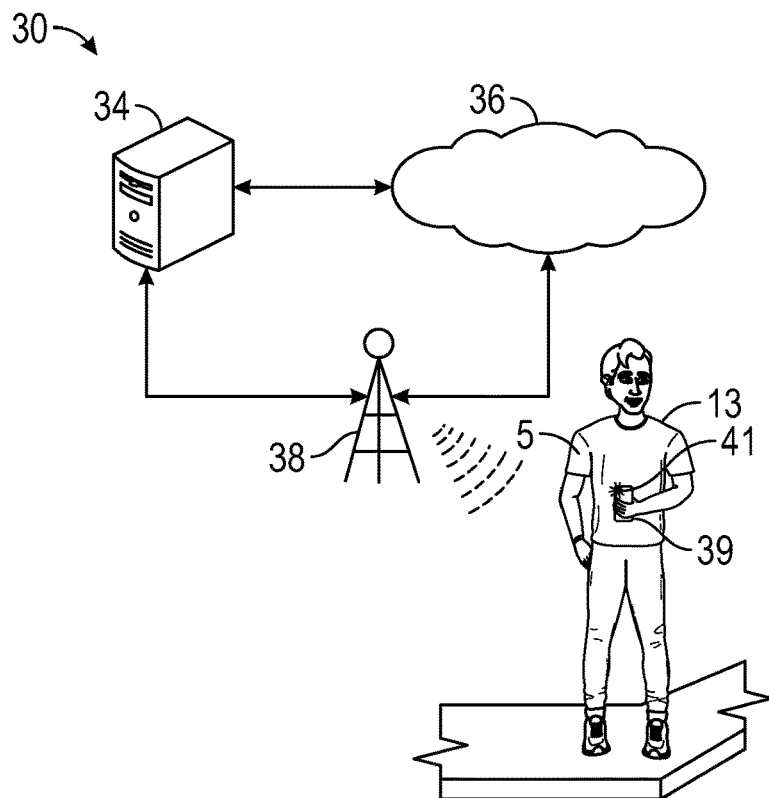
FIG. 3 is a diagrammatic illustration of a representative decentralized computing system for authenticating an article of clothing.
Figure 4:
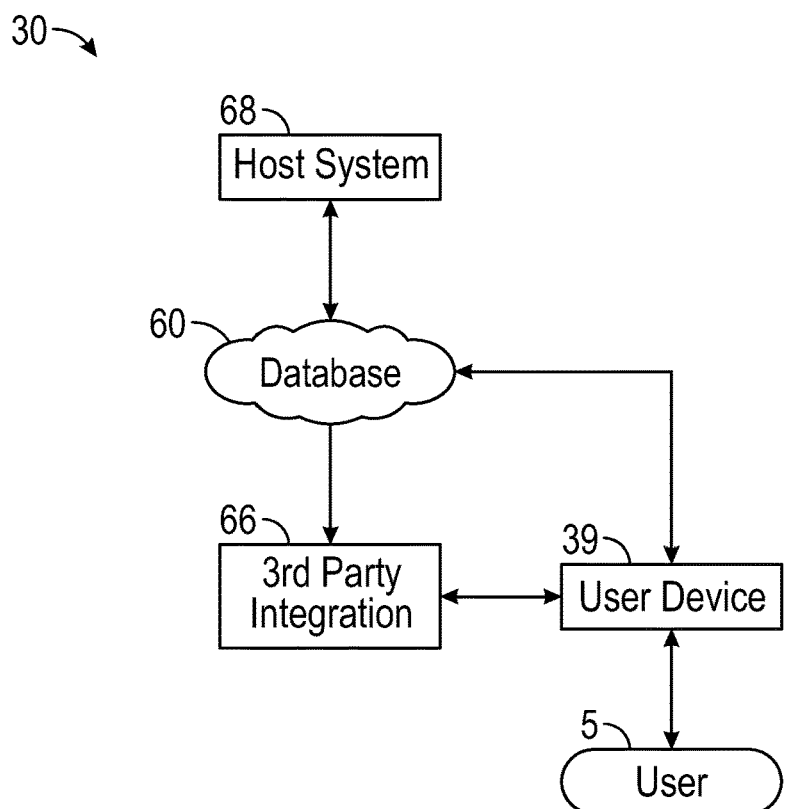
FIG. 4 is a diagrammatic illustration of the functional structure of a decentralized computing system of FIG. 3 for authenticating an article of clothing in accordance with aspects of the present disclosure.

FIGS. 3 and 4 provide one example of the functional structure of a decentralized computing system 30, such as shown in FIG. 2. As generally illustrated, a user 5 may operatively interface with an interface device 39 (i.e., interface device 39) that may include one or more of a smart phone, a tablet computer, a smart watch, a laptop computer, a desktop computer, a standalone video game console, smart footwear/apparel, or other similar internet enabled devices. The interface device 39 may be operatively configured to communicate with one or more of a database 60 (e.g., authentic fingerprint database and/or a blockchain service/network, referred to herein as blockchain), and/or a $3^{rd}$ party integration service 66.

In general, the database 60 may include at least one authentic digital fingerprint registered thereon, which represent the contents of a machine-readable identifier 7 of an authentic article of clothing 9 and/or encoded sole). The user 5, via the interface device 39, may be in possession of, or may be in communication with the database 60, that includes authentic digital fingerprints that are each associated with particular machine-readable identifier 7 to authenticate the article of clothing 9. Each stored authentic digital fingerprint represents at least one of the machine-readable identifier 7 (e.g., article of apparel 11, footwear 10, etc.). In addition, the database 60 may include at least one non-fungible token registered thereon that includes genomic information representative of a digital asset. The user 5, via the interface device 39, may be in possession of, or may be linked with a locker/wallet that includes a private cryptographic key that permits the interface device 39 to read the encrypted data associated with the token. The wallet may be a hot wallet, which is connected to the internet, or a cold storage, which is an offline wallet used for storing a private cryptographic key. The machine-readable identifier 7 may be a private key. This key may further enable the user 5 to freely transfer ownership of the token. The machine-readable identifier 7 may enable access to a token, database entry, or other blockchain ledger entry that has one or more product attributes recorded to it. For instance, the product attributes are attributes of the article of clothing 9 and may include data relating to where the product was made, how the product was made, features of the product, and/or sustainability information about the product. As a non-limiting example, the sustainability information may include an indication that the product was made with a certified organic material or through environmentally friendly manufacturing methods (e.g., certified organic designations).

In an embodiment, the machine-readable identifier 7 may be a private cryptographic key that is used to access one or more digital tokens stored in connection with a unique public cryptographic key. The stored tokens may be, for example, nonfungible tokens (NFT), such as those adhering to Ethereum Request for Comments (ERC) 721 or ERC1155 protocols. The NFT may be uniquely created to represent the user's physical shoe on the distributed block chain ledger. In this manner, the NFT may be an authentication mechanism with the shoe itself serving as cold storage for its own authenticity validating key. In some embodiments, the NFT may also (or alternatively) represent a digital collectable that a user may freely trade once gaining access to the original private key included at the time of manufacturing.

In another embodiment, the machine-readable identifier 7 may be a private cryptographic key that is used to access one or more fungible tokens stored in connection with a unique public cryptographic key. Additionally, the public cryptographic key may also be digitally stored on the shoe, for example, in the same or different machine-readable identifier 7 as used to represent the private cryptographic key. By including both a public cryptographic key and a private cryptographic key, the article of footwear in this example may be akin to a cold storage wallet where an owner may securely store cryptocurrency, such as BITCOIN™. Storing cryptocurrency in this offline manner thus provides a degree of security, where access to the physical product would be required to gain access to the cryptocurrency.

With reference to FIG. 4, the computing system 30 may further include a $3^{rd}$ party integration service 66 that may enable the use of the authentic digital fingerprints in different contexts or manners. The $3^{rd}$ party integration service 66 may operate as an API on an app provided on the interface device 39 (i.e., user device), or as a dedicated cloud-based service. In some embodiments, the $3^{rd}$ party integration service 66 may make the authentic fingerprints available for external use. Examples of such a use may include digital artwork displays, physical print generation, manufacturing production, and the like.

As further shown in FIG. 3, in one configuration, a corporate host system 68 may be in communication with the database 60 for the purpose of provisioning/creating new authentic digital fingerprints. Additionally, the host system 68 may provide one or more rules for constraining the manner and style in which information from the database is expressed in a visual/artistic form in the machine-readable identifier 7.

Figure 5:
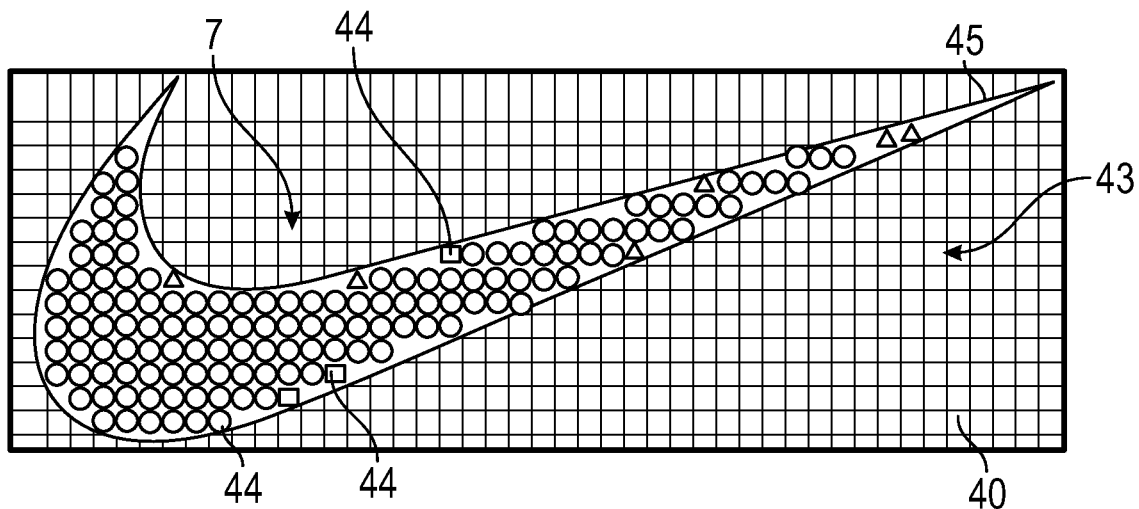
FIG. 5 is a front view of a machine-readable identifier for the article of footwear of FIG. 1 or the article of apparel of FIG. 2, in accordance with aspects of the present disclosure.

With reference to FIG. 5, the machine-readable identifier 7 includes a plurality of identifying ciphers 44 in a respective predetermined discrete area 40. In the present disclosure, the plural term "predetermined discrete areas" and the term "grid" are used interchangeably. Each of the identifying ciphers 44 may include an encoding symbol, a greyscale color, and/or a geometric shape. The geometric shape may be a circle, a square, and/or a triangle. To create the predetermined discrete areas 40, the machine-readable authentic identifier 7, a grid 40 may be virtually placed on the machine-readable identifier 7 and its background 43 to maximize the number of identifying ciphers 44 disposed on the machine-readable identifier 7. If the grid 40 is used, all of the predetermined discrete areas 40 have exactly the same size to facilitate scanning the machine-readable identifier 7. Thus, each square in the grid 40 is referenced to herein as one of the predetermined discrete areas 40. Different combinations of identifying ciphers 44 may be used to fill the machine-readable authentic identifier 7. For example, in the depicted embodiment, no predetermined discrete area 40 includes more than one machine-readable authentic identifier 7 to facilitate authentication of the article of clothing 9. Further, each identifying cipher 44 may be a geometric shape with a particular greyscale color. The machine-readable identifier 7 (e.g., logo) may have a border 45 that identifies the area of interest that includes the identifying ciphers 44. The border 45 has a color that is opposite to the color of the background 43 to ease detection of the machine-readable identifier 7. For instance, if the background 43 of the machine-readable identifier 7 is white, the border 45 of the machine-readable identifier 7 may be black to facilitate detection of the machine-readable identifier 7 by the sensor 41 (e.g., camera). The color may be either a specific color at a discrete location (e.g., color at one of the predetermined discrete areas 40) or average color in the square of the grid 40.

If the identifying ciphers 44 have greyscale colors, the greyscale colors may be represented with a binary number (i.e., zero or one). The greyscale color that is closest to the color of the background 43 of the machine-readable identifier 7 (e.g., logo) may be represented with the binary number zero. For instance, if the color of the background 43 is black (i.e., with a greyscale value of 0), then the greyscale colors with a greyscale value between 0 and 0.99 represent binary number 0. Greyscale colors with a greyscale value between 1 and 2 are reserved and unused. Greyscale colors with a greyscale value greater than 2 represent binary number 1. The greyscale values and associated binary numbers described above facilitate detection of the machine-readable identifier 7 with the sensor 41 (e.g., camera) of the interface device 39.

The identifier 7 may be digitally printed on the article 9 with electrically conductive ink. To generate conductive ink printing instructions, the binary numbers may be associated with the electrical resistance of the conductive ink used for each discrete location (e.g., predetermined discrete area 40). For example, the binary number 0 may be associated with conductive ink having an electrical resistance that is less than 100 Ohms. As such, the conductive ink at the particular location of the article 9 that has been designated with the binary number 0 should have an electrical resistance that is less than 100 Ohms. The reserved colors (e.g., the greyscale colors with a greyscale value between 1 and 2) may be associated with a conductive ink having an electrical resistance between 150 Ohms and 300 Ohms. As such, the conductive ink at the particle location of the article 9 that has been designated with the reserved colors should have an electrical resistance between 150 Ohms and 300 Ohms. The binary number 1 may be associated with a conductive ink having an electrical resistance that is greater than 300 Ohms. As such, the conductive ink at the particular location of the article 9 that has been designated with binary number 1 should have an electrical resistance that is greater than 300 Ohms. Thus, the electrical resistance is used to determine which conductive ink will be used to print each identifying cipher 44 in the machine-readable identifier 7. The term "conductive ink" means an ink that results in a printed object which can conduct electricity. The conductive ink may be created by infusion graphite or other conductive material included into ink.

While in the example described above, the identifying ciphers 44 have greyscale colors in a greyscale wheel, it is envisioned that the identifying ciphers 44 may have colors in the red-green-blue color wheel/chart (i.e., RGB color wheel/chart). The color of the background 43 of the machine-readable identifier 7 (e.g., logo) is used to determine the range in the greyscale or color wheel charts used to encode bits. The RGB color wheel values may be represented with 8-bit values, 16-bit values, 24-bit values, or other suitable bit values. The differences in colors (in the greyscale or RGB color wheel) may be visually indistinguishable to the naked eye, but detectable by the sensor 41 (e.g., camera) of the interface device 39. The designers may use color interaction pairing principles to create a pleasant fill in the machine-readable identifier 7.

Figure 6:
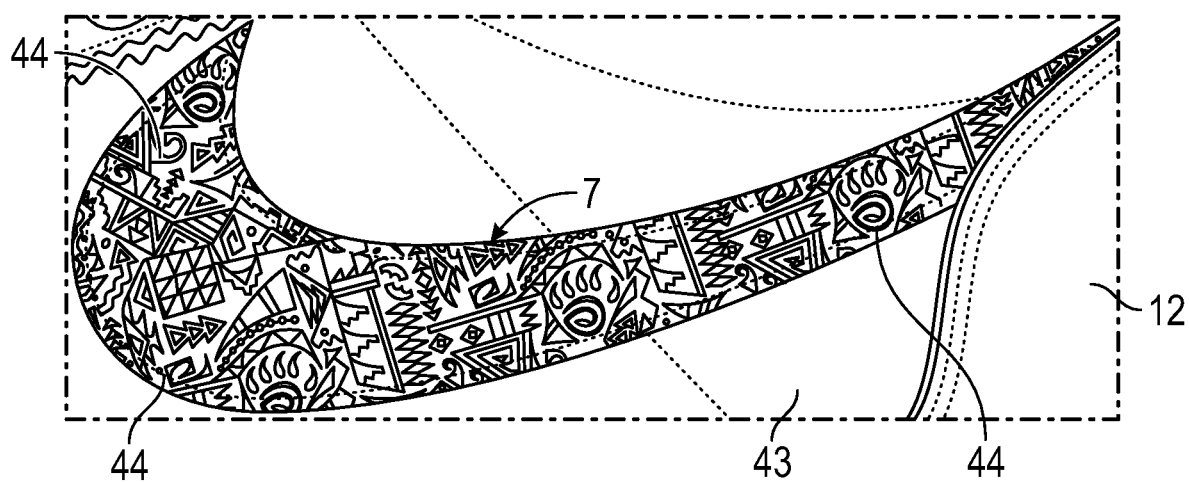
FIG. 6 is a front view of a machine-readable identifier for the article of footwear of FIG. 1 or the article of apparel of FIG. 2, in accordance with aspects of the present disclosure.

With reference to FIG. 6, the identifying ciphers 44 may be encoding symbols with artistic designs instead of (or in addition to) basic geometric shapes. For example, in the depicted embodiment, identifying ciphers 44 may be drawings of paws, arrows, and hollow diamonds, among others.

As a non-limiting example, the identifier 7 may be printed with a laser printed black ink. Instead of a visible patterned encoding as shown in FIGS. 5 and 6, the identifier 7 may be encoded with ink that it is not visible in daylight (or when subjected to a camera flash) until a certain condition is met. For example, the identifier 7 may be printed with an invisible ink, such as ultraviolet (UV) ink. That way, the designer may be free to visually design the identifier 7 without regard to specific visual shapes or colors. As defined herein, the term UV ink means ink that is visible when under an ultraviolet lamp. Alternatively or additionally, the ink forming the identifier 7 may be a photochromatic ink, mechanochromatic ink, thermochromatic ink, hydrochromatic ink, and/or UV visible.

Figure 6A:
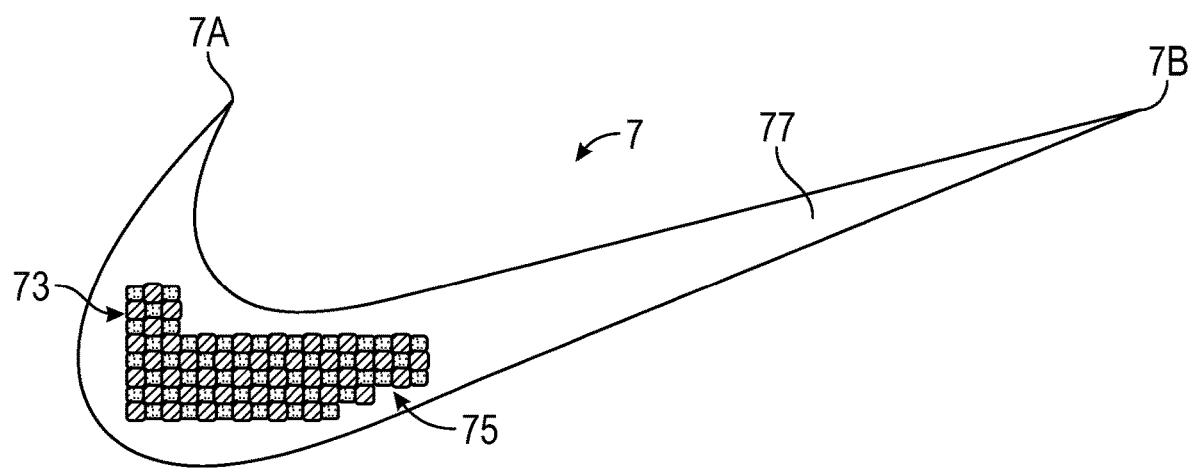
FIG. 6A is a front view of a machine-readable identifier in accordance with an aspect of the present disclosure.

With reference to FIG. 6A, the identifier 7 may include seventy-two (72) encoded bits to minimize the data needed to be encoded. To identify and the detect the uniqueness in the article of clothing 9, the encoded bits may include encoded data relating to product style, product color(s), and data relating to cyclic redundancy check (CRC).

The identifier 7 may additionally include two regions (i.e., first identifying region 73 and a second identifying region 75) for alignment and accurate grid size determination. The first identifying region 73 may be disposed on the top left of the identifier 7, and the second identifying region 75 may be on the right-most portion of the identifier 7. By using this arrangement, designers have plenty of dark matter area 77 for the conductive ink in order to ease manufacturing of the identifier 7. The resistance of the conductive ink may be measured, using solely two probes, at the edges of the identifier 7. Specifically, to measure the resistance of the conductive ink, a first probe may be disposed at a top-left point 7A, and another probe may be disposed at the right-most point 7B of the identifier 7. The resistance is then measured across the top-left point 7A and the right-most point 7B of the identifier 7 to confirm the uniqueness of the article of clothing 9. However, it is contemplated that other layouts may be used to measure the resistance of the conductive ink. For example, the first identifying region 73 may be located at the top of the identifier 7, and the second identifying region 75 may be located at the bottom of the identifier 7. In another example, the first identifying region 73 is disposed at the right-most portion of the identifier 7, and the second identifying region 75 is disposed at the top left of the identifier 7. The resistance measurement may represent digits, which can be compared to digits stored on the database 60. A checksum function may be used to return a predetermined output value, which is a function of the digits identified by the resistance measurement. This predetermined output value obtained by the checksum function is compared with a value stored on the database 60 to determine whether the article of clothing 9 is authentic. If the predetermined output value obtained by the checksum function matches the value stored on the database 60, the article of clothing 9 is authentic.

The immutable cryptographic database, such as a blockchain network, may store data relating to the product style, the product color(s), the serial number of the article of clothing 9, and the electrical resistance between the top-left point 7A and the right-most point 7B of the identifier 7. The data embedded on the identifier 7 is compared to the data stored on the immutable cryptographic database to determine if the article of clothing 9 is authentic. If the data embedded on the identifier 7 matches the data stored on the immutable cryptographic database, then the article of clothing 9 is authentic.

Figure 7:
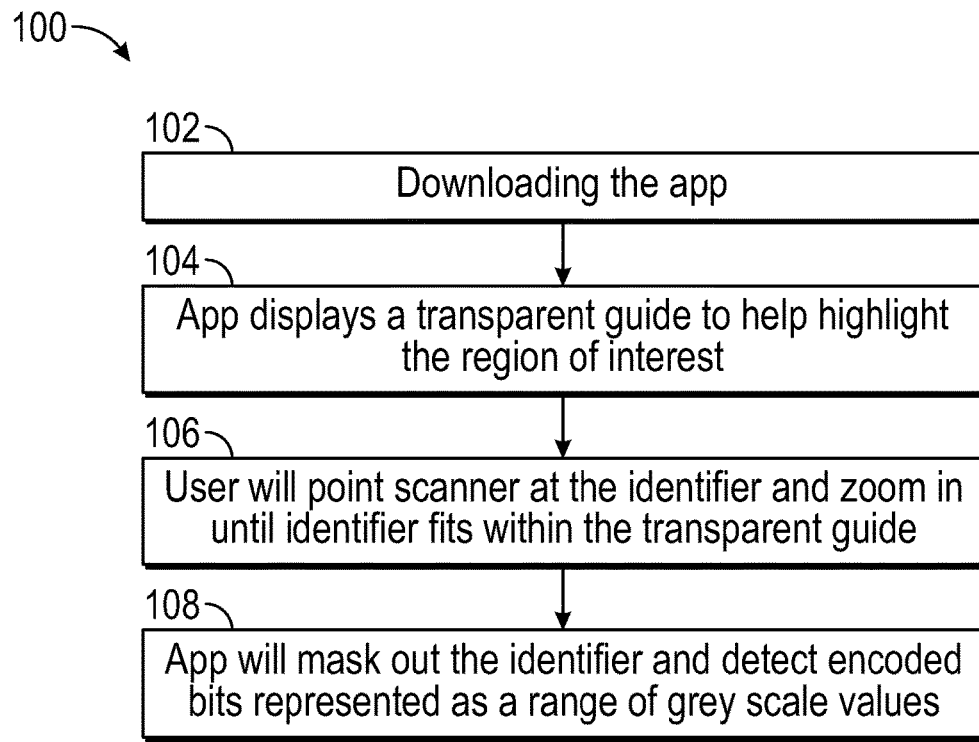
FIG. 7 is a flowchart of a method of authenticating an article of clothing in accordance with aspects of the present disclosure.

FIG. 7 is a simplified flowchart of a method 100 for authenticating the article of clothing 9. This method 100 may also be referred to as a method for the decoding the machine-readable identifier 7 of the article of clothing 9. Before executing the method 100, one or more pre-steps may be performed. For example, the user 5 may download and install an app 46 on the interface device 39. As discussed above, the interface device 39 may be a tablet, smart phone, a tablet computer, a smart watch, a laptop computer, a desktop computer, or other similar internet enabled devices. Regardless, the interface device 39 includes a processor or other suitable processing device, to operate the app 46. As discussed above, the interface device 39 includes a sensor 41, such as a camera, configured to scan the machine-readable identifier 7 to determine the authenticity of the article of clothing 9. At block 102, the app 46 may be downloaded from the 3$^{rd}$ party integration service 66. After downloading and installing the app 46 on the interface device 39, the method 100 may begin at block 104.

At block 104, the user 5 commands, via the app 46, the interface device 39 to display a transparent guide in the shape of the machine-readable identifier 7 to help highlight the region of interest. The transparent guide may be a black silhouette with a transparent fill and background. The silhouette has the shape of the machine-readable identifier 7 (e.g., logo) to help guide the field of view of the sensor 41 (e.g., camera), thereby enabling the user to scan the machine-readable identifier 7. Then, the method 100 proceeds to block 106.

At block 106, the user 5 points the sensor 41 of the interface device 39 toward the machine-readable identifier 7 of the article of clothing 9. The user 5 aligns the transparent guide with the machine-readable identifier 7 until the machine-readable identifier 7 fits and fills the transparent guide. To do so, the user 5 may zoom in until the machine-readable identifier 7 fits inside the transparent guide.

Figure 8:
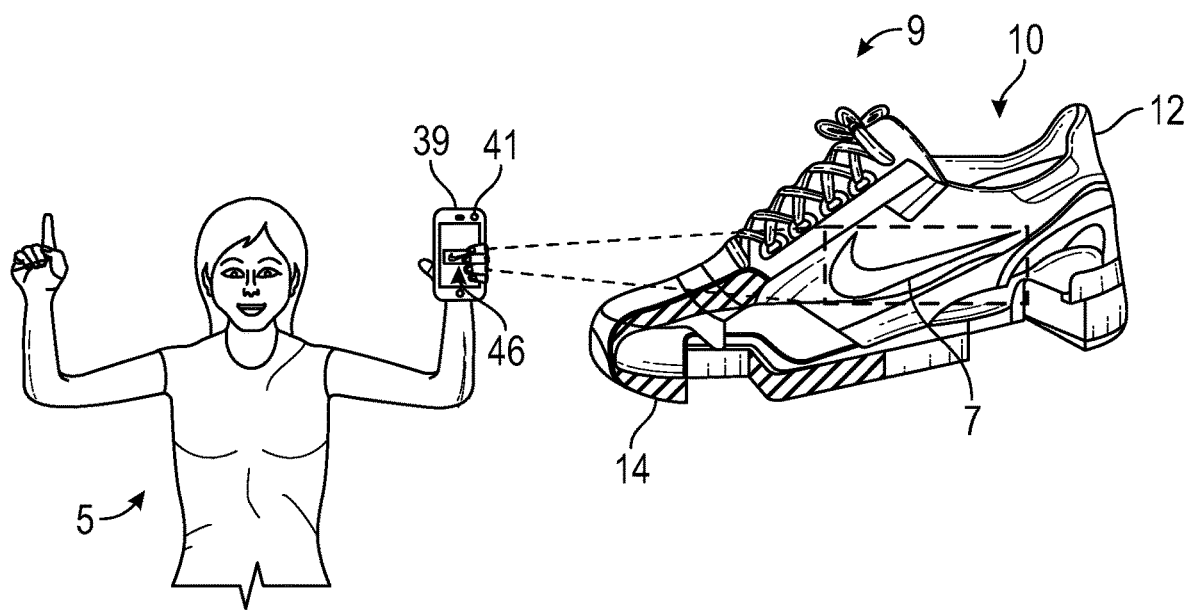
FIG. 8 is a schematic illustration of a user scanning the article of clothing (e.g., article of footwear) to authenticate the article of clothing.

FIG. 8 illustrates the user 5 pointing the sensor 41 of the interface device 39 toward the article of footwear 10. While pointing the sensor 41 toward the article of clothing 9, the app displays an image of the machine-readable identifier 7 superimposed on the transparent guide to help the user 5 align the machine-readable identifier 7 within the field of view of the sensor 41.

Returning to FIG. 7, at block 106, the app may automatically detect when machine-readable identifier 7 fits inside the transparent guide. To do so, the app 46 may automatically detect when the border 45 of the machine-readable identifier 7 is aligned with the silhouette of the transparent guide. In response to detecting that the border 45 of the machine-readable identifier 7 is aligned with the silhouette of the transparent guide, the method 100 proceeds to block 108.

At block 108, the app 46 captures an image, such as a still image, of the machine-readable identifier 7 and masks out the regions of the captured image that are outside the machine-readable identifier 7 (i.e., the region of interest). The app 46 then detects the identifying ciphers 44 in each of the predetermined discrete areas 40. For example, the app 46 may detect the encoded bits represented as a range of greyscale values and/or RGB color values in each of the predetermined discrete areas 40. The app 46 then retrieves a product digital fingerprint of the scanned article of clothing 9 (e.g., article of apparel 11 or article of footwear 10). The product digital fingerprint represents the contents (e.g., identifying ciphers 44) of the machine-readable identifier 7 disposed on the article of clothing 9, which can be captured by, for example, a scanner. Accordingly, the product digital fingerprint may include type, location, shape, and spacing of the identifying ciphers 44. The app 46 subsequently compares an authentic digital fingerprint with the product digital fingerprint. The authentic digital fingerprint is stored on the database 60 and includes the contents (e.g., data relating to the type, location, shape, and spacing of identifying cyphers 44) that should be on an authentic article of clothing 9). If and only if the authentic digital fingerprint matches the authentic digital fingerprint, then the app 46 determines the article of clothing 9 is authentic. In other words, if the contents of the product digital fingerprint of the article of clothing 9 are the same as the contents of the authentic digital fingerprint stored on the database 60, then the app 46 determines that the article of clothing 9 is authentic. The app 46 then commands the interface device 39 to display a message, indicating that the article of clothing 9 is authentic.

Figure 9:
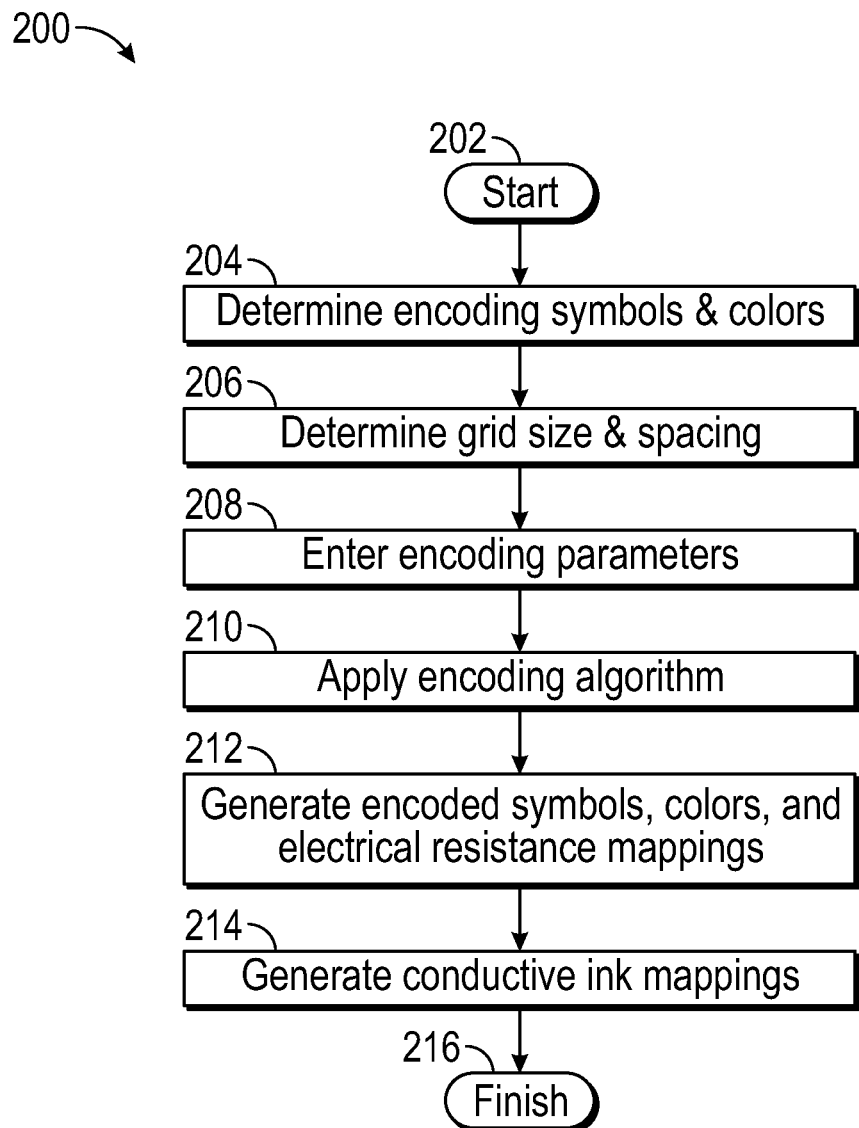
FIG. 9 is a flowchart of a method of manufacturing an article of clothing shown in FIGS. 1 and 2 with the machine-readable identifier.

FIG. 9 is a flowchart of a method 200 for making the article of clothing 9 (e.g., article of footwear 10 or article of apparel 11). The method 200 starts at block 202 and may be executed by the remote host system 34 and/or a cloud computing system 36. To do so, the remote host system 34 and/or a cloud computing system 36 may include a processor and a non-transitory machine-readable media. In other words, the remote host system 34 or a cloud computing system 36 may be specifically programmed to execute the method 200. After block 202, the method 200 proceeds to block 204. At block 204, the manufacturer determines the contents and characteristics of the identifying ciphers 44 in the machine-readable identifier 7. The contents of the identifying ciphers 44 may depend on the colors of the article of clothing 9 and on whether the manufacturer is making an article of footwear 10 or an article of apparel 11. In particular, at block 204, the manufacture or designer selects the encoding symbols, color wheel (e.g., greyscale color or RGB color wheel), the color of the background 43 of the machine-readable identifier 7 (e.g., logo), the greyscale value and/or color values range within a predetermined value range, the encoding bits associated with each predetermined value range, and the electrical resistance values associated with each encoding bit. After block 204, the method 200 continues to block 206.

At block 206, the manufacturer determines the size of the grid 40 (i.e., the grid size) based on the contents of the contents and characteristics (i.e., the symbols of the identifying ciphers 44) in the machine-readable identifier 7. Once the grid size is selected, it is fixed. Also, at block 206, the manufacturer selects the spacing between each identifying cipher 44 (e.g., encoding symbol). The vertical and horizontal spacing between all of the adjacent identifying ciphers 44 is the same to ease detection of the identifying ciphers 44 by the sensor 41. The method 200 then continues to block 208.

At block 208, encoding parameters are inputted in the remote host system 34 and/or a cloud computing system 36. The encoding parameters include, but are not limited to, manufacturing date, manufacturing id, serial number, product style, color(s), and global trade item number (GTIN) of the article of clothing 9 (e.g., article of footwear 10 or article of apparel 11). The method 200 then proceeds to block 210.

At block 210, the remote host system 34 and/or a cloud computing system 36 apply an encoding algorithm to determine the appropriate identifying ciphers 44 (e.g., encoding symbols and colors) for each bit value. This step results in generating an array of symbols, electrical resistance, and colors. This array is referred to as the data array. Also, at block 210, the checksum of this data array is calculated and encoded at least in the most significant bits (e.g., binary bits 1). The method 200 then continues to block 212.

At block 212, the array of identifying ciphers 44 (e.g., symbols, electrical resistance mapping for the conductive ink, color of the symbols, and mappings of the symbols) are assembled. The array of the identifying ciphers 44 includes the electrical resistance values for each predetermined discrete area. A Boolean value of 1 is used for the most significant bit and the least significant bit to easily locate the identifying ciphers 44 (e.g., symbols) within the machine-readable identifier 7. In a greyscale array, the most significant bits are repressed by the color black, and the least significant bits are represented by the color white, or vice-versa. The method 100 then proceeds to block 214.

At block 214, the remote host system 34 and/or a cloud computing system 36 generates ink jet printing instructions based on the assigned electrical resistance values determined at block 212 in order to print the machine-readable identifier 7 (e.g., logo). The ink jet printing instructions include the location of the conductive ink on the article of clothing 9 (e.g., article of footwear 10 or article of apparel 11), the color, the symbol, and the electrical resistance of the conductive ink for each location. The remote host system 34 and/or a cloud computing system 36 then prints the machine-readable identifier 7 on the article of clothing 9 in accordance with the ink jet printing instructions. In particular, the machine-readable identifier 7 is printed with conductive ink having the assigned electrical resistance values for each of the plurality of discrete areas 40 of the machine-readable identifier 7. The unique machine-readable identifier 7 can then be used to track the article of clothing 9 using minimal hardware (e.g., sensor 41). Thus, the machine-readable identifier 7 can be used to uniquely identify each article of clothing 9 and track its history including the purchaser information. Then, at block 216, the method 200 ends.

Figure 10:
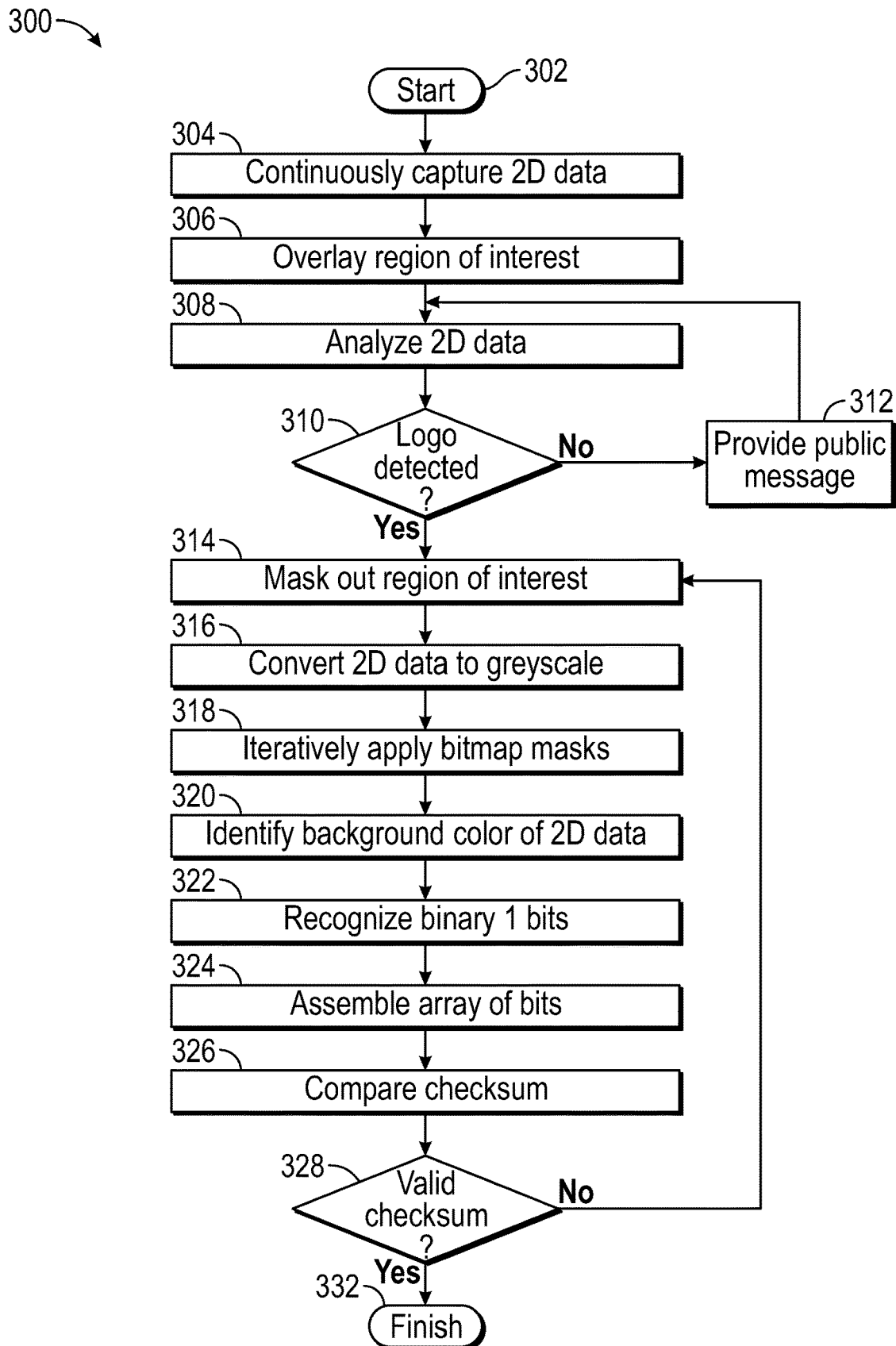
FIG. 10 is a flowchart of a detailed method for authenticating an article of clothing.

FIG. 10 is a flowchart of a detailed method 300 of authenticating the article of clothing 9 (e.g., article of footwear 10 or article of apparel 11). The method 300 begins at block 302. Then, the method 300 proceeds to block 304. At block 304, the sensor 41 of the interface device 39 (e.g., smart phone) continuously captures a two-dimensional (2D) image data from the article of clothing 9. To do so, the user 5 activates, via the app 46, the sensor 41 (e.g., camera) of the interface device 39 to continuously capture and record images of the article of clothing in the non-transitory media of the interface device 39 for further analysis. After block 304, the method 300 proceeds to block 306.

At block 306, the app 46 operating on the interface device 39 displays a transparent guide in the shape of the machine-readable identifier 7 to help highlight the region of interest in response to activating the sensor 41 of the interface device 39. In other words, the app 46 overlays the transparent guide over the image of the region of interest (i.e., the machine-readable identifier 7 on the article of clothing 9). The transparent guide may be a solid color silhouette (e.g., color silhouette) with a transparent fill and background. The silhouette has the shape of the machine-readable identifier 7 (e.g., logo) to help guide the field of view of the sensor 41 (e.g., camera), thereby enabling the user to scan the machine-readable identifier 7.

At block 308, the app 46 running on the interface device 39 analysis the 2D image data captured by the sensor 41. To do so, the user 5 points the sensor 41 of the interface device 39 toward the machine-readable identifier 7 of the article of clothing 9. The user 5 aligns the transparent guide with the machine-readable identifier 7 until the machine-readable identifier 7 fits and fills the transparent guide. The user 5 may zoom in until the machine-readable identifier 7 fits inside the transparent guide. The app 46 applies a matching machine vision technique to find and isolate the machine-readable identifier 7 (e.g., logo) within the 2D captured image data. Then, the method 300 proceeds to block 310.

At block 310, the app 46 operating on the interface device 39 determines whether the machine-readable identifier 7 (e.g., logo) has been detected on the article of clothing 9. If the machine-readable identifier 7 cannot be detected on the article of clothing 9, then the method 300 proceeds to block 312. At block 312, the interface device 39 instructs the user 5, via the app, to zoom-in until the machine-readable identifier 7 (e.g., logo) appears and fits within the transparent guide (e.g., silhouette with transparent fill in the shape of the machine-readable identifier 7). After block 312, the method 300 returns to block 308. If the machine-readable identifier 7 has been detected on the article of clothing 9 at block 310, then the method 300 continues from block 310 to block 314.

At block 314, the interface device 39 masks out the reminder of the captured image that is outside of the transparent guide. In other words, the interface device 39 masks out the regions of the captured image that are outside the machine-readable identifier 7 and a designated background 43 of the machine-readable identifier 7 (i.e., the region of interest). The method 300 then proceeds to block 316.

At block 316, depending on the background color of the machine-readable identifier 7 (i.e., the color of the background 43), the interface device 39 converts the 2D image to greyscale or uses a predetermined color chart for further processing. For instance, if the color of the background 43 is white, then the interface device 39 converts the 2D image captured by the sensor 41 into greyscale. On the other hand, if the color of the background 43 is a color in the RGB color wheel (e.g., blue), then the interface device 39 uses a RGB color wheel or chart for further processing. Then, the method 300 proceeds to block 318.

At block 318, the interface device 39 iterates through a list of masks (i.e., predetermined stored ciphers). The list of masks is a combination of standard and custom symbols required to detect each data bit represented by a range of colors at each predetermined discrete area 40 within the machine-readable identifier 7. Then, the method 300 continues to block 320.

At block 320, the interface device 39 identifies the background color of the machine-readable identifier 7 (i.e., the color of the background 43) to determine the range of the greyscale colors or colors in the RGB color wheel, which represent the binary number 0 that are similar to the background color. Then, the method 300 proceeds to block 322.

At block 322, the interface device 39 recognizes a first group of bits (e.g., the binary 1 bits of FIG. 10). In other words, the interface device 39 uses the predetermined uppermost range of the greyscale colors and/or the RGB colors to determine a data bit value of binary number 1. The method 300 then continues to block 324.

At block 324, the interface device 39 assembles an array bits with the most significant bit represented at the right most corner of the machine-readable identifier 7 (e.g., logo). The method 300 then proceeds to block 326. As discussed above, the machine readable identifier 7 may include two regions (i.e., first identifying region 73 and a second identifying region 75) for alignment and accurate grid size determination as shown in FIG. 6A. The first identifying region 73 may be disposed on the top left of the identifier 7, and the second identifying region 75 may be on the right-most portion of the identifier 7. The resistance of the conductive ink may be measured, using solely two probes, at the edges of the identifier 7. Specifically, to measure the resistance of the conductive ink, a first probe may be disposed at a top-left point 7A, and another probe may be disposed at the right-most point 7B of the identifier 7. The resistance is then measured across the top-left point 7A and the right-most point 7B of the identifier 7 to confirm the uniqueness of the article of clothing 9. The resistance measurement between the top-left point 7A and the right-most point 7B may be represented by digits, which can be compared to digits stored on the database 60. These digits are assembled as an array of bits.

At block 326, the interface device 39 uses the leftmost 8 bits as a checksum to validate the detected bit values. A checksum function may be used to return a predetermined output value, which is a function of the digits identified by the resistance measurement. The method 300 then continuous to block 328.

At block 328, the interface device 39 validates the checksum. To do so, the stored checksum generated in the method 200 is compared with the checksum generated in the block 326. If the checksum generated in block 326 is the same as the checksum generated in the method 200, then the article of clothing 9 is determined to be authentic. Then, the method 300 ends at block 332. Block 328 also entails accessing a token, database, or other blockchain ledger entry that has data about one or more product attributes or features (i.e., attributes of article of footwear 10 or article of apparel 11) in response to authenticating the article of clothing 9. In other words, in response to validating the checksum after reading the machine-readable identifier 7, the interface device 39 is able to access a token, database entry, or other blockchain ledger entry that has one or more product attributes recorded to it. The product attributes are attributes of the article of clothing 9 and may include data relating to where the product was made, how the product was made, features of the product and/or sustainability information about the product. As a non-limiting example, the sustainability information may include an indication that the product was made with a certified organic material or through environmentally friendly manufacturing methods (e.g., certified organic designations). Then, the interface device 39 may display the product attributes after accessing the token, database entry or blockchain ledger entry.

Figure 11:
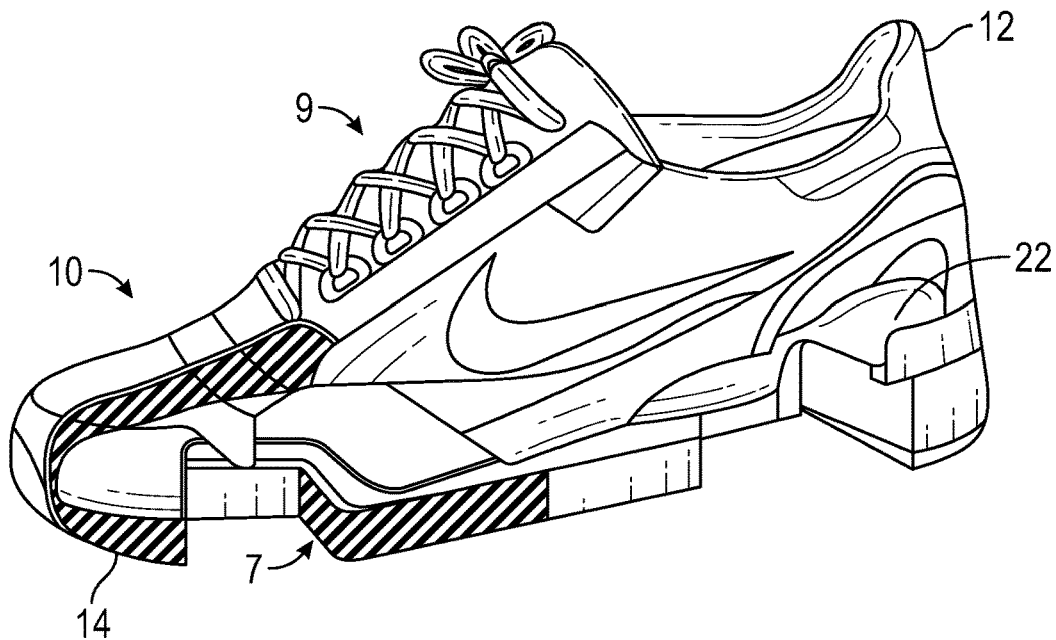
FIG. 11 is a side, isometric view of an article of clothing (e.g., article of footwear) including ferromagnetic material to authenticate the article of clothing.
Figure 12:
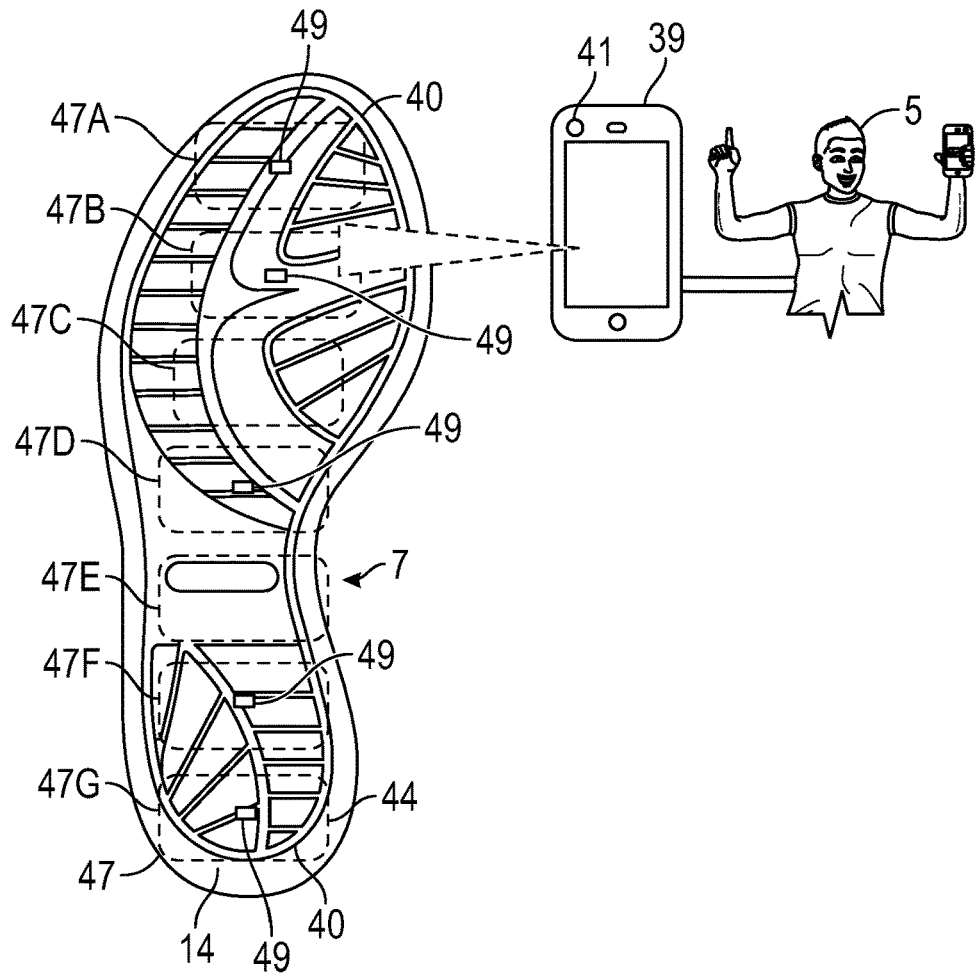
FIG. 12 is a bottom view of an illustration of an article of clothing including magnetic zones being scanned by a user using an interface device.

As an alternative embodiment, FIG. 11 illustrates that the article of clothing 9 may be an article of footwear 10. In aspects of the present disclosure, the article of footwear 10 includes an upper 12 and a sole structure 14 attached to the upper 12 as discussed above with respect to FIG. 1. The sole structure 14 includes an insole 22. As used herein, the term "insole" is an innermost piece material of the sole structure 14 that runs underneath and supports the bottom of the foot. The entire insole 22 may be magnetized to prevent bacteria growth in the sole structure 14, thereby minimizing odor in the article of footwear 10. The remaining of the sole structure 14, however, includes predetermined discrete areas 40 magnetic zones, which include naturally magnetic particles and/or magnetized particles. For example, as shown in FIG. 12, the entire sole structure 14 can be considered to be the machine-readable identifier 7 that includes the predetermined discrete areas 40. Therefore, the predetermined discrete areas 40 may be referred to as magnetic zones 47. In the depicted embodiment, the predetermined discrete areas 40 in the sole structure 14 are referred to as magnetic zones 47 (i.e., magnetic zones 47A, 47B, 47C, 47D, 47E, 47F, and 47G). The magnetic profile, or discrete portions thereof, are formed by one or more magnetic zones 47 and may serve as one manner of embedding a registrable identifier 7, While seven magnetic zones 47 are illustrated, it is envisioned that the sole structure 14 may include more or fewer magnetic zones 47 arranged across the longitudinal and/or lateral dimensions/areas of the sole structure 14. Each magnetic zone 47 may include randomly-dispersed magnetic particles within the foam of the sole structure 14, which would allow the manufacture to imprint a magnetic signature on the sole structure 14. Each magnetic zone 47 may include one or more naturally magnetic materials and/or magnetizable materials. Each magnetic zone 47 has a magnetic property (e.g., a magnetic flux density value). For instance, the magnetic zones 47 may each have different magnetic flux density values in order to make it harder to duplicate. Alternatively, at least some or all of the magnetic zones 47 may have the same magnetic flux density value. In this case, the magnetic properties (e.g., magnetic density flux values) are considered the identifying ciphers 44, and the magnetic zones 47 are considered the predetermined discrete areas 40. Each of the predetermined discrete areas 40 (e.g., magnetic zone 47) has a particular magnetic density flux value (e.g., identifying cipher 44).

The user 5 may use the interface device 39 to measure the magnetic properties (e.g., magnetic flux density values) of each magnetic zone 47. To do so, the sensor 41 may be a magnetometer or other sensor suitable to measure a magnetic property, such as a magnetic flux density value, in each magnetic zone 47 of the sole structure 14. The sensor 41 may be part of the interface device 39, for example a dedicated scanner or other suitable devices configured to measure a magnetic property of the magnetic zones 47, such as magnetic flux density values. The magnetic flux density values measured in each magnetic zone 47 are considered to be part of a product digital fingerprint. On the other hand, magnetic flux density values stored on the database 60 are considered to be an authentic digital fingerprint.

The product digital fingerprint is then compared with the authentic digital fingerprint. In other words, the magnetic flux density values measured in each magnetic zone 47 are compared with stored identifying ciphers (e.g., stored magnetic properties, such as magnetic flux density values, for each magnetic zone 47). If the product digital fingerprint matches the authentic digital fingerprint stored on the database 60, then the app 46 operating on the interface device 39 displays a message that the article of clothing 9 is authentic. In other words, if each measured magnetic flux density value in each of the predetermined discrete areas 40 (e.g., magnetic zones 47) matches the corresponding stored magnetic property (e.g., magnetic flux density value) for each of the respective predetermined discrete areas 40 (e.g., magnet zone 47), then an app 46 operating on the interface device 39 (e.g., smartphone) displays a message that the article of clothing 9 is authentic. On the other hand, if the product digital fingerprint does not match the authentic digital fingerprint stored on the database 60, then the app 46 operating on the interface device 39 displays a message that the article of clothing 9 is not authentic. In other words, if each magnetic property (e.g., magnetic flux density value) in each of the predetermined discrete areas 40 (e.g., magnetic zones 47) does not match the corresponding stored magnetic property (e.g., magnetic flux density value) for each of the respective predetermined discrete areas 40 (e.g., magnet zone 47), then an app 46 operating on the interface device 39 (e.g., smartphone) displays a message that the article of clothing 9 is not authentic.

Figure 13:
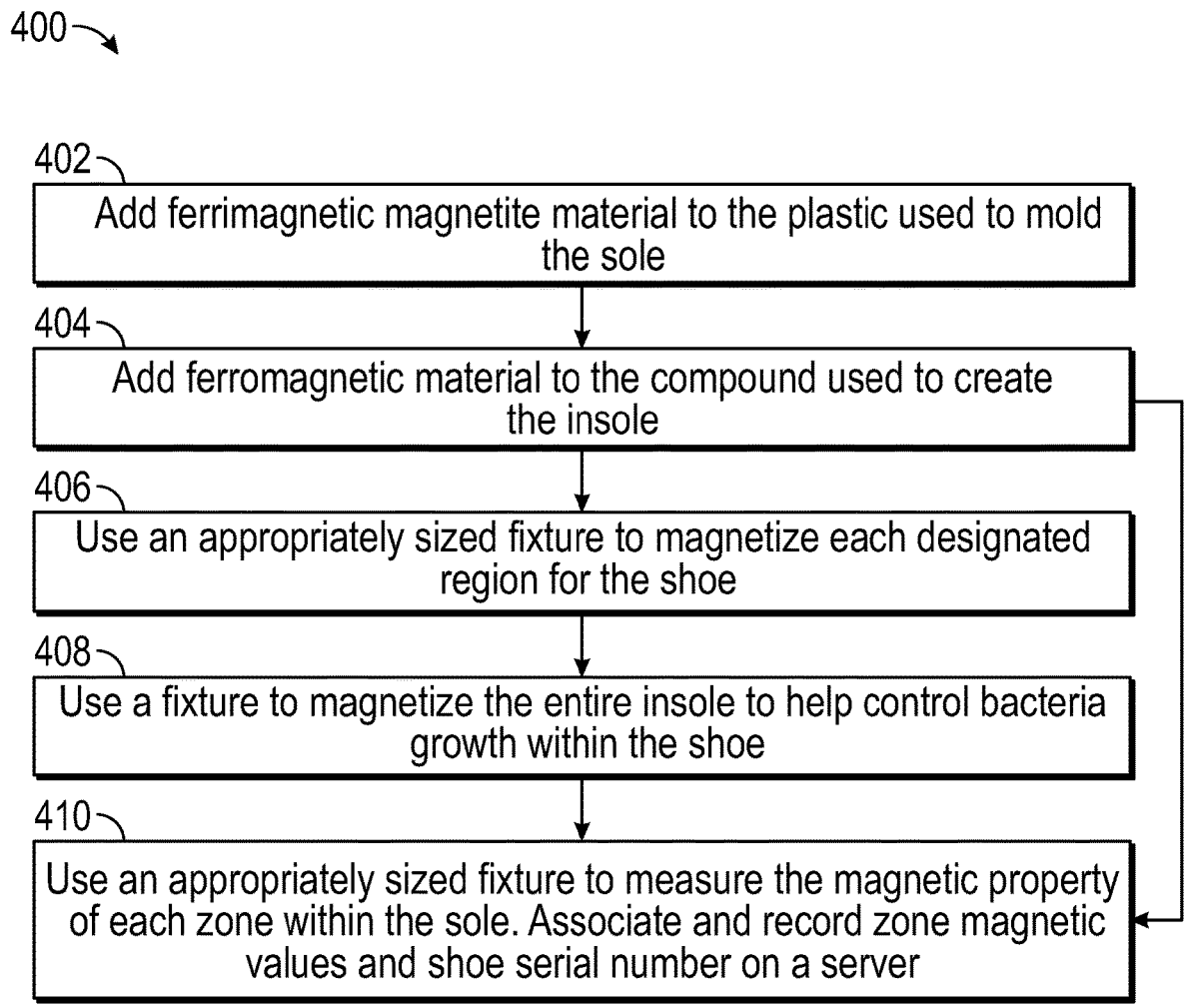
FIG. 13 is a flowchart of a method of manufacturing an article of clothing with magnetic zones.

FIG. 13 is a flowchart of a method 400 for manufacturing the article of clothing 9 (e.g., article of footwear 10) with magnetic zones 47 for the purpose of creating authentic digital fingerprints. The method 400 begins at block 402. At block 402, a magnetizable or a naturally magnetic material, such as a ferrimagnetic material, is added to the polymeric material used to mold the sole structure 14. A suitable ferrimagnetic material may be magnetite ($Fe_3O_4$). Naturally magnetic particles or magnetizable particles may be added to the polymer material used to make the sole structure 14. Specifically, the magnetic or selectively magnetizable particles may be embedded within a foam or outsole during the initial fabrication of the sole structure 14. Due to the nature of the molding process, there is a high likelihood that these particles may achieve a random distribution and/or dispersion through the foam midsole and/or outsole. The naturally magnetic particles may be randomly dispersed in the polymeric material used to make the sole structure 14, thereby making the machine-readable identifier 7 difficult to duplicate. Alternatively, the magnetizable particles allow the manufacturer to create a unique magnetic signature in the magnetic zones 47. The method 400 then proceeds to block 404.

At block 404, a magnetic material, such as a ferromagnetic material, is added to the compound used to create the insole 22. The magnetic material in the insole 22 inhibits bacteria growth and may be used as a second authentication factor. The method 400 then proceeds to block 406.

At block 406, an appropriately sized fixture is used to magnetize each predetermine discrete area 40 (e.g., magnetic zone 47) in the article of clothing 9. For example, solely the magnetic zones 47A, 47B, 47C, 47D, 47E, 47F, and 47G in the sole structure 14 of the article of footwear 10 are magnetized with random magnetic property values. A magnetizer may be used to magnetize the magnetic zones 47. These magnetic zones 47 are spaced apart from each other to facilitate scanning with the sensor 41 of the interface device 39. This step is optional because the magnetic zones may be provided with naturally magnetic particles at block 402. The method 400 then proceeds to block 408.

At block 408, a fixture is used to magnetize the entire insole 22 to help control bacteria growth within the article of clothing 9 (e.g., article of footwear 10). Block 408 is optional. The method 400 then proceeds to block 410.

At block 410, an appropriately sized fixture is used to measure the magnetic property (e.g., magnetic flux density value) in each magnetic zone 47 of the article of clothing 9. A magnetometer, such as a gaussmeter or a teslameter, may be used to measure the magnetic property values in each magnetic zone 47. The magnetic properties (e.g., magnetic flux density value) are stored on remote host system 34 and/or a cloud computing system 36. The stored magnetic values for the magnetic zones form the authentic digital fingerprint. The stored magnetic values for each magnetic zone 47 are associated with a unique serial number for the article of clothing 9 (e.g., article of footwear 10). This association is also stored on the remote host system 34 and/or a cloud computing system 36. The method 400 could end at block 410.

Figure 14:
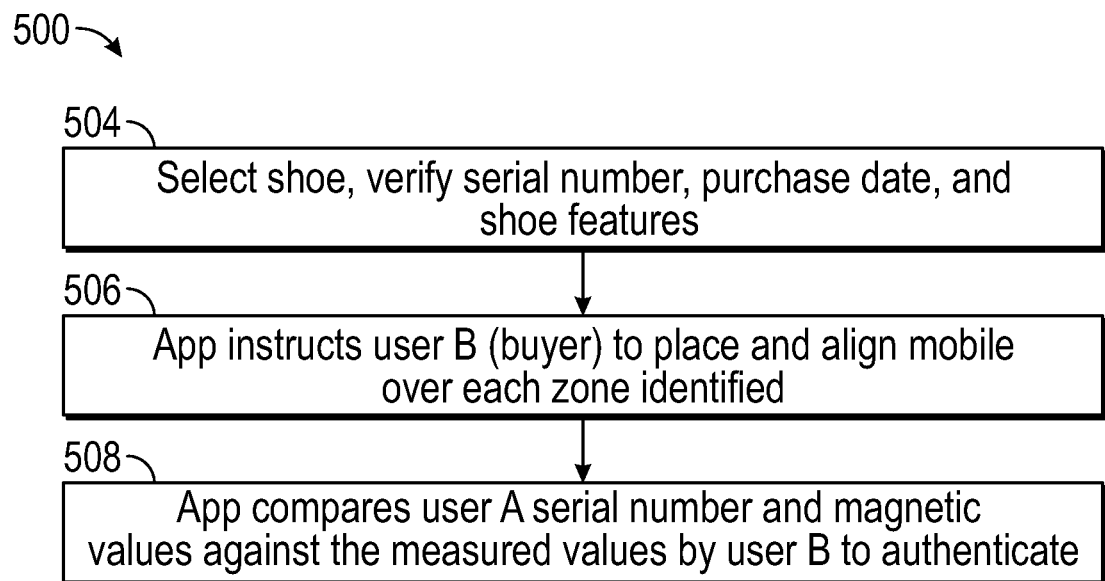
FIG. 14 is a flowchart of a method for authenticating an article of clothing using magnetic zones.

FIG. 14 is a flowchart of a method 500 for authentication of the article of clothing 9 using magnetic zones 47. Before executing the method 500, a number of pre-steps may be performed. For example, a stored serial number may be printed on the article of clothing 9 and/or on the packaging (e.g., box) for the article of clothing 9. The stored serial number may be printed on a box for the article of footwear 10. Further, when the article of clothing 9 is sold to a purchaser, the identification number of the purchaser may be stored on the remote host system 34 and/or a cloud computing system 36. Also, the identification number of the purchaser may be associated with the serial number of the article of clothing. This association is stored on the remote host system 34 and/or a cloud computing system 36. Moreover, the user 5 may download and install an app 46 on the interface device 39 as shown in FIG. 8. As discussed above, the interface device 39 may be a tablet, smart phone, a tablet computer, a smart watch, a laptop computer, a desktop computer, or other similar interne enabled devices. Regardless, the interface device 39 includes a processor or other suitable processing device, to operate the app 46. As discussed above, the interface device 39 may include a sensor 41, such as a magnetometer, configured to magnetic properties (magnetic density flux value) in each predetermined discrete area 40 (e.g., magnetic zones 47) of the sole structure 14 to determine the authenticity of the article of clothing 9 (e.g., article of footwear 10). The app 46 may be downloaded from the $3^{rd}$ party integration service 66. After downloading and installing the app 46 on the interface device 39, the method 500 may be executed.

The method 500 begins at block 504. At block 504, the user 5 may select (on the app 46) the article of clothing 9 and may verify the unique serial number, the purchase date, and/or the features of the article of clothing 9 using the app 46. Then, the method 500 continues to block 506.

At block 506, the app instructs the user 5 (e.g., the buyer) to place and align the interface device 39 over each of the predetermined discrete areas 40 (e.g., magnetic zones 47). In response, the sensor 41 (e.g., magnetometer) of the interface device 39 measures the magnetic property (e.g., magnetic density flux values) in each predetermined discrete areas 40 of the article of clothing 9. After measuring and recording the magnetic property values of each predetermined discrete area 40, the method 500 proceeds to block 508.

At block 508, the app 46 compares the measured magnetic property values (e.g., the magnetic flux density values) in each magnetic zone 47 with stored identifying ciphers 44 (e.g., stored magnetic properties, such as magnetic flux density values) for each magnetic zone 47). The app 46 also compares the serial number on the packaging of the article of clothing 8 with the serial number stored on the app. If each magnetic property value (e.g., magnetic flux density value) in each of the predetermined discrete areas 40 (e.g., magnetic zones 47) matches the corresponding stored magnetic property value (e.g., magnetic flux density value) for each of the respective predetermined discrete areas 40 (e.g., magnet zone 47) and the serial number on the packaging matches the serial number stored on the app, then an app 46 operating on the interface device 39 (e.g., smartphone) displays a message that the article of clothing 9 is authentic. Block 508 also entails accessing a token, database entry, or other blockchain ledger entry that has data about one or more product attributes in response to authenticating the article of clothing 9. In other words, in response to determining that each magnetic property value (e.g., magnetic flux density value) in each of the predetermined discrete areas 40 (e.g., magnetic zones 47) matches the corresponding stored magnetic property value (e.g., magnetic flux density value) for each of the respective predetermined discrete areas 40 (e.g., magnet zones 47) and the serial number on the packaging matches the serial number stored on the app 46 after reading the machine-readable identifier 7, the interface device 39 is able to access a token, database entry, or other blockchain ledger entry that has one or more product attributes recorded to it. The product attributes are attributes of the article of clothing 9 and may include data relating to where the product was made, how the product was made, features of the product, and/or sustainability information about the product. As a non-limiting example, the sustainability information may include an indication that the product was made with a certified organic material or through environmentally friendly manufacturing methods (e.g., certified organic designations). Then, the interface device 39 may display the product attributes after accessing the token, database entry, or blockchain ledger entry.

If some, but not all, of the magnetic property values of the predetermined discrete areas 40 (e.g., magnetic zones 47) match the corresponding stored magnetic property value for the respective predetermined discrete areas 40, then the app 46 operating on the interface device 39 may display a message indicating how many regions match. If each magnetic property (e.g., magnetic flux density value) in each of the predetermined discrete areas 40 (e.g., magnetic zones 47) does not match the corresponding stored magnetic property (e.g., magnetic flux density value) for each of the respective predetermined discrete areas 40 (e.g., magnet zone 47) or the serial number on the packaging does not match the serial number stored on the app, then an app 46 operating on the interface device 39 (e.g., smartphone) displays a message that the article of clothing 9 is not authentic.

The manufacturing methods 200 and 400 may be combined to manufacture an article of clothing 9, requiring a dual-factor authentication process to authenticate the article of clothing 9. Accordingly, the dual-factor authentication process may be a combination of the authentication method 300 (FIG. 7) and the authentication method 500 (FIG. 14). For the case of the article of footwear 10, the upper 12 and the sole structure 14 include machine-readable identifiers 7. Alternatively, or additionally, the dual-factor authentication process may include using a location feature to locate the hidden machine-readable identifier 7. The location feature may be one or more near field communication (NFC)-enabled devices 49 (FIG. 12) disposed in the magnetic zones 47 of the article of clothing 9. The NFC-enabled devices 49 may be used to locate one or more magnetic zones 47. The location feature may be a digitally printed image (e.g., logo) that represents the machine-readable identifier as shown in FIG. 7. For instance, the machine-readable identifier 7 encoded in a logo or graphic provided on the upper 12 of the article of footwear 10 may point to specific regions of a magnetic or magnetizable sole structure 14 of the article of footwear 10 from which a second identifier code may be extracted. Further, as discussed above with respect to FIGS. 7 and 8, the sensor 41 of the interface device 39 may be used to locate the digitally printed image (e.g., logo). Although a dual-authentication process is discussed above, more than one machine-readable identifier 7 may be used as part of a multi-authentication technique. For example, the one machine-readable identifier 7 may provide instructions on how or where a second encoded machine-readable identifier 7 can be extracted.

While authentication is one use of the present technology, the machine-readable identifier 7 may also be used for storing a unique code for other purposes. For example, in one configuration, the embedded identifier 7 may serve as an unlock code, electronic ticket/pass, or private cryptographic key for unlocking a digital collectible, a digital attribute, digital experience, or for providing special functionality of in an electronic application, early access to subsequently released merchandise, or the like. For example, in one configuration, the embedded identifier 7 may be a cryptographic key or unique code linked to a cryptographic private key that may enable a user to acquire a cryptographically secured digital collectible (e.g., one registered to an immutable ledger such as represented via blockchain technology). Examples of such cryptographically secured digital collectables (e.g., "CryptoKicks") are described in U.S. patent application Ser. No. 16/423,671, which issued as U.S. Pat. No. 10,505,726 on Dec. 10, 2019. In other words, the machine-readable identifier 7 may be a private key of a blockchain, and the article of clothing 9 may function as a wallet for the private key. The private key is configured as a token that is uniquely registered on the blockchain. The blockchain may be a private chain that runs solely on a specific company's computers rather than a public chain. The sensor 41 may be used at an event (e.g., a sporting event) to decode the machine-readable identifier 7 to unlock a digital collectible. The digital collectible may further be secured to the blockchain. In another embodiment, the embedded identifier 7 may enable a user to acquire an attribute pack for modifying an attribute of a cryptographically secured digital collectable or for providing unique ability improvements or an alteration to the appearance of a user-controllable character in a video game application.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, bubble memory, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software or a combination thereof, in a computer system or other processing system.

Any of the methods described herein may include machine readable instructions for execution by: (a) a processor, (b) a controller, and/or (c) any other suitable processing device. Any algorithm, software, control logic, protocol or method disclosed herein may be embodied as software stored on a tangible medium such as, for example, a flash memory, a CD-ROM, a floppy disk, a hard drive, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms are described with reference to flowcharts depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features. Additional features may be reflected in the following clauses:

Clause 1. A method of authenticating an article of clothing, comprising: providing a machine-readable identifier, wherein the machine-readable identifier is attached to the article of clothing, the machine-readable identifier is representative of an authenticity of the article of clothing attached thereto, the machine-readable identifier includes a plurality of identifying ciphers, each of the plurality of identifying ciphers is disposed in a respective predetermined discrete area of a plurality of predetermined discrete areas of the machine-readable identifier; receiving a scanned image of the machine-readable identifier to detect the identifying ciphers of each of the predetermined discrete areas; retrieving a predetermined stored cipher for each of the predetermined discrete areas each corresponding to one of the plurality of predetermined discrete areas; comparing the identifying ciphers of each of the predetermined discrete areas with the predetermined stored ciphers for each of the predetermined discrete areas to determine if each identifying cipher in each of the predetermined discrete areas matches a corresponding stored cipher for each of the respective predetermined discrete areas; and determining that the article of clothing is authentic in response to determining that each identifying cipher in each of the predetermined discrete areas matches the corresponding stored cipher for each of the respective predetermined discrete areas.

Clause 2. The method of clause 1, wherein the machine-readable identifier is digitally printed image on the article of clothing, and the digitally printed image includes the plurality of predetermined discrete areas.

Clause 3. The method of clauses 1-2, wherein the machine-readable identifier includes a unique logo directly disposed on the article of clothing.

Clause 4. The method of clauses 1-2, wherein the machine-readable identifier is a barcode.

Clause 5. The method of clauses 1-2, wherein the identifying ciphers of each of the predetermined discrete areas includes a plurality of encoding symbols.

Clause 6. The method of clauses 1-5, wherein at least one of the plurality of encoding symbols includes a graphical shape, and the graphical shape includes at least one chosen from a circle, a square, or a triangle.

Clause 7. The method of clauses 1-6, wherein the identifying ciphers of each of the predetermined discrete areas has a greyscale color, and the greyscale color represents a binary number.

Clause 8. The method of clauses 1-6, wherein receiving the scanned image of the machine-readable identifier includes continuously receiving image data from the machine-readable identifier. The article of clothing is at least one chosen from an article of apparel and an article of footwear.

Clause 9. The method of clauses 1-8, wherein the article of clothing is an article of footwear, the article of footwear including an upper and a sole structure attached to the upper, and the predetermined discrete areas are a plurality of magnetic zones of the sole structure.

Clause 10. The method of clauses 1-9 wherein the magnetic zones include at least one chosen from a plurality of naturally magnetic particles and a plurality of magnetized particles.

Clause 11. The method of clauses 1-10, wherein each of the predetermined discrete areas has a respective magnetic flux density value, the identifying ciphers of each of the predetermined discrete areas is the respective flux density value.

Clause 12. The method of clauses 1-11, wherein the identifying ciphers of each of the predetermined discrete areas is a magnetic flux density value of each of the predetermined discrete areas, the predetermined stored ciphers for each of the predetermined discrete areas is a stored value, and the stored value for each of the predetermined discrete areas is compared with the magnetic flux density value of each of the predetermined discrete areas to determine if each magnetic flux density value in each of the predetermined discrete areas matches a corresponding stored value for each of the respective predetermined discrete areas.

Clause 13. The method of any of clauses 1-12, wherein the article of clothing includes a location feature to locate each of the predetermined discrete areas in the article of clothing.

Clause 14. The method of any of clauses 1-13, wherein the location feature is at least one chosen from a near field communication (NFC)-enabled device and a digitally printed image.

Clause: 15. The method of any of clauses 1-14, wherein the article of clothing is an article of footwear, the article of footwear including an upper and a sole structure attached to the upper, the plurality of predetermined discrete areas is located in at least one chosen from the upper and the sole structure.

Clause 16. The method of any of clauses 1-15, wherein the machine-readable identifier is a private key for a wallet.

Clause 17. The method of any of clauses 1-16, wherein the private key is configured as a token that is uniquely registered on a blockchain.

Clause 18. The method of any of clauses 1-17, wherein the article of clothing functions as the wallet and embodies the private key.

Clause 19. The method of clauses 1-18, wherein the blockchain is a private chain.

Clause 20. The method of any of clauses 1-19, wherein the sensor reads the machine-readable identifier to retrieve the machine-readable identifier from the article of clothing to unlock a digital collectible.

Clause 21. The method of any of clauses 1-20, wherein the digital collectible is associated with the blockchain.

Clause 22. The method of any of clauses 1-21, further comprising enabling access to a blockchain ledger entry or database entry in response to determining that the article of clothing is authentic, wherein the blockchain ledger entry or database entry includes at least one product attribute, the at least one product attribute is an attribute of the article of clothing, the at least one product attribute includes data about one of: where the product was made, how the product was made, features of the product, or sustainability information about the article of clothing.

Clause 23. An article of clothing, comprising a machine-readable identifier; wherein the machine-readable identifier includes a plurality of predetermined discrete areas; wherein the machine-readable identifier includes a plurality of identifying ciphers; wherein each of the plurality of identifying ciphers is disposed in a respective predetermined discrete area of a plurality of predetermined discrete areas of the machine-readable identifier; and wherein each of the plurality of identifying ciphers in each of the predetermined discrete areas matches a remotely-stored cipher for each of the respective predetermined discrete areas to facilitate authentication of the article of clothing.

Clause 24. The article of clothing of clause 23, wherein the article of clothing is an article of footwear, the article of footwear includes an upper and a sole structure attached to the upper, and the machine-readable identifier is a logo on the upper.

Clause 25. The article of clothing of any of clauses 23-24, wherein the logo is a digitally-printed image on the upper, the logo includes conductive ink, and the plurality of identifying ciphers includes a plurality of colors, each color having color values, the color values are grouped in a plurality of predetermined value ranges, and an encoding bit is associated with a respective predetermined value range of the predetermined value ranges.

Clause 26. The article of clothing of any of clauses 23-25, wherein at least one of the plurality of identifying ciphers is an encoding symbol.

Clause 27. The article of clothing of any of clauses 23-26, wherein the article of clothing is an article of apparel, the article of apparel is a shirt, the shirt includes a main shirt body, a first sleeve attached to the main shirt body, and a second sleeve attached to the main shirt body, the machine-readable identifier is disposed on the main shirt body, the machine-readable identifier is a logo, the logo includes conductive ink, at least one of the plurality of identifying ciphers is a geometric shape, and the geometric shape is at least one chosen from a triangle, a square, and a circle.

Clause 28. The article of clothing of any of clauses 23-27, wherein the article of clothing is an article of footwear, the article of footwear includes an upper and a sole structure attached to the upper, each of the predetermined discrete areas is a magnetic zone on the sole structure, each magnetic zone has a corresponding magnetic density flux value that matches a remotely-stored magnetic density flux value for each of a respective magnetic zone to facilitate authentication of the article of footwear.

Clause 29. The article of clothing of any of the clauses 23-28, wherein the sole structure includes an insole that is entirely magnetized to prevent bacteria growth in the sole structure.

Clause 30. The article of clothing of any of clauses 23-29, wherein each of the magnetic zones includes a plurality of randomly-dispersed magnetic particles.

Clause 31. The article of clothing of any of clauses 23-30, wherein the magnetic zones have magnetic density flux values that are different from one another.

Clause 32. The article of clothing of any of clauses 23-31, further comprising a location feature to locate each of the predetermined discrete areas in the article of clothing.

Clause 33. The article of clothing of any of clauses 23-32, wherein the location feature is at least one chosen from a near field communication (NFC)-enabled device and a digitally printed image.

Clause 34. A method of manufacturing an article of clothing, comprising: placing a machine-readable identifier on the article of clothing; and wherein the machine-readable identifier is representative of an authenticity of the article of clothing, and the machine-readable identifier includes a plurality of identifying ciphers, each of the plurality of identifying ciphers is disposed in a respective predetermined discrete area of a plurality of predetermined discrete areas of the machine-readable identifier.

Clause 35. The method of clause 34, further comprising determining contents and characteristics of the plurality of identifying ciphers in the machine-readable identifier.

Clause 36. The method of any of clauses 34-35, further comprising determining a size of a grid based on the contents of the contents and characteristics of the plurality of identifying ciphers in the machine-readable identifier, and each square of the grid is one of the predetermined discrete areas.

Clause 37. The method of any of clauses 34-36, further comprising inputting encoding parameters into a remote host system, wherein the encoding parameters include manufacturing date, manufacturing id, serial number, product style, colors, and global trade item number (GTIN) of the article of clothing.

Clause 38. The method of any of clauses 34-37, further comprising assigning a bit value to each of the plurality of identifying ciphers.

Clause 39. The method of any of clauses 34-38, further comprising assigning electrical resistance values to each bit value, wherein the assigning the electrical resistance values includes assigning the electrical resistance values for each of the plurality of predetermined discrete areas.

Clause 40. The method of any of clauses 34-39, further comprising generating generates ink jet printing instructions based on the assigned electrical resistance values to print the machine-readable identifier on the article of clothing.

Clause 41. The method of any of clauses 34-40, wherein placing the machine-readable identifier on the article of clothing includes printing the machine-readable identifier based on the assigned electrical resistance values.

Clause 42. The method of any of clauses 34-41, wherein the machine-readable identifier is printed with conductive ink having the assigned electrical resistance values for each of the plurality of discrete areas of the machine-readable identifier.

Clause 43. The method of any of clauses 34-42, wherein the article of clothing is an article of footwear, the article of footwear includes an upper and a sole structure coupled to the upper, wherein placing the machine-readable identifier on the article of clothing comprises adding a magnetic material to a polymeric material used to mold the sole structure to form magnetic zones in the sole structure, and the magnetic zones are the predetermined discrete areas of the machine-readable identifier.

Clause 44. The method of any of clauses 34-43, wherein adding the magnetic material includes adding randomly dispersing natural magnetic particles in the polymeric material used to mold the sole structure.

Clause 45. The method of any of clauses 34-44, wherein adding the magnetic material includes adding magnetizable material in the polymeric material used to mold the sole structure.

Clause 46. The method of any of clauses 34-45, further comprising magnetizing each of the magnetic zones.

Clause 47. The method of any of clauses 34-46, further comprising measuring a magnetic property value of each of the magnetic zones and storing the magnetic property values of each of the magnetic zones in a remote host system.

What is claimed:

1. A method of authenticating an article of clothing, comprising:
   providing a machine-readable identifier on an exterior surface of an article of clothing, the machine-readable identifier comprising a digitally printed image having a plurality of predefined discrete areas, and wherein the image includes a cipher at each of the plurality of predefined discrete areas, the cipher comprising at least one of a symbol, a color, or a geometric shape, and wherein the ciphers from the plurality of predefined discrete areas are representative of an authenticity of the article of clothing attached thereto, the machine-readable identifier includes a plurality of identifying ciphers, each of the plurality of identifying ciphers is disposed in a respective predetermined discrete area of a plurality of predetermined discrete areas of the machine-readable identifier;
   receiving a scanned image of the machine-readable identifier to detect the identifying ciphers of each of the predetermined discrete areas;
   retrieving a predetermined stored cipher for each of the predetermined discrete areas each corresponding to one of the plurality of predetermined discrete areas;
   comparing the identifying ciphers of each of the predetermined discrete areas with the predetermined stored ciphers for each of the predetermined discrete areas to determine if each identifying cipher in each of the predetermined discrete areas matches a corresponding stored cipher for each of the respective predetermined discrete areas; and
   determining that the article of clothing is authentic in response to determining that each identifying cipher in each of the predetermined discrete areas matches the corresponding stored cipher for each of the respective predetermined discrete areas; and
   wherein the plurality of identifying ciphers encode bits of data, that together comprise a cryptographic private key or digital address operative to access a token uniquely registered on a blockchain, and wherein determining that the article of clothing is authentic comprises accessing the token via the cryptographic private key or digital address.

2. The method of claim 1, wherein the identifying ciphers of each of the predetermined discrete areas has a greyscale color, and the greyscale color represents a binary number.

3. The method of claim 1, wherein receiving a scanned image of the machine-readable identifier includes continuously receiving image data from the machine-readable identifier using a camera, and the article of clothing is at least one chosen from an article of apparel and an article of footwear.

4. The method of claim 1, wherein the article of clothing includes a location feature to locate each of the predetermined discrete areas in the article of clothing, and the location feature is at least one chosen from a near field communication (NFC)-enabled device and a digitally printed image.

5. The method of claim 1, further comprising unlocking a digital collectible from the scanned image of the machine-readable identifier.

6. A method of authenticating an article of clothing, comprising:
   providing a machine-readable identifier, wherein the machine-readable identifier is attached to the article of clothing, the machine-readable identifier is representative of an authenticity of the article of clothing attached thereto, the machine-readable identifier includes a plurality of identifying ciphers, each of the plurality of identifying ciphers is disposed in a respective predetermined discrete area of a plurality of predetermined discrete areas of the machine-readable identifier;
   receiving a scanned image of the machine-readable identifier to detect the identifying ciphers of each of the predetermined discrete areas;
   retrieving a predetermined stored cipher for each of the predetermined discrete areas each corresponding to one of the plurality of predetermined discrete areas;
   comparing the identifying ciphers of each of the predetermined discrete areas with the predetermined stored ciphers for each of the predetermined discrete areas to determine if each identifying cipher in each of the predetermined discrete areas matches a corresponding stored cipher for each of the respective predetermined discrete areas; and
   determining that the article of clothing is authentic in response to determining that each identifying cipher in each of the predetermined discrete areas matches the corresponding stored cipher for each of the respective predetermined discrete areas; and
   wherein the article of clothing is an article of footwear, the article of footwear including an upper and a sole structure attached to the upper, the predetermined discrete areas are a plurality of magnetic zones of the sole structure, the magnetic zones include at least one chosen from a plurality of naturally magnetic particles and a plurality of magnetized particles, the identifying ciphers of each of the predetermined discrete areas is a magnetic flux density value of each of the predetermined discrete areas, the predetermined stored cipher for each of the predetermined discrete areas is a stored value, and the stored value for each of the predetermined discrete areas is compared with the magnetic flux density value of each of the predetermined discrete areas to determine if each magnetic flux density value in each of the predetermined discrete areas matches a corresponding stored value for each of the respective predetermined discrete areas.

7. An article of clothing, comprising:
a machine-readable identifier;
wherein the machine-readable identifier comprises a digitally printed image that includes a plurality of predetermined discrete areas;
wherein the machine-readable identifier includes a plurality of identifying ciphers;
wherein each of the plurality of identifying ciphers is disposed in a respective predetermined discrete area of a plurality of predetermined discrete areas of the machine-readable identifier; and
wherein each of the plurality of identifying ciphers in each of the predetermined discrete areas matches a remotely-stored cipher for each of the respective predetermined discrete areas; and
wherein the article of clothing is an article of footwear, the article of footwear includes an upper and a sole structure attached to the upper, at least one of the predetermined discrete areas is a magnetic zone on the sole structure having a magnetic density flux that is representative of at least one of the plurality of identifying ciphers.

8. The article of clothing of claim 7, wherein the machine-readable identifier further comprises a logo on the upper.

9. The article of clothing of claim 8, wherein the logo includes digitally-printed image on the upper, the logo includes conductive ink, and the plurality of identifying ciphers includes a plurality of colors, each color having color values, the color values are grouped in a plurality of predetermined value ranges, and an encoding bit is associated with a respective predetermined value range of the predetermined value ranges.

10. The article of clothing of claim 7, wherein at least one of the plurality of identifying ciphers is an encoding symbol.

11. The article of clothing of claim 7, wherein the sole structure includes an insole that is entirely magnetized to prevent bacteria growth in the sole structure.

12. The article of clothing of claim 11, wherein each of the at least one magnetic zones includes a plurality of randomly-dispersed magnetic particles.

13. The article of clothing of claim 12, wherein the sole structure comprises a plurality of magnetic zones, each having magnetic density flux values that are different from one another.

14. The article of clothing of claim 7, further comprising a location feature to locate each of the predetermined discrete areas in the article of clothing.

15. The article of clothing of claim 14, wherein the location feature is at least one chosen from a near field communication (NFC)-enabled device and a digitally printed image.

* * * * *